United States Patent [19]
Barabash et al.

[11] Patent Number: 5,179,633
[45] Date of Patent: Jan. 12, 1993

[54] METHOD AND APPARATUS FOR EFFICIENTLY IMPLEMENTING READ-TYPE PROCEDURAL ATTACHMENTS IN RETE-LIKE PATTERN MATCHING ENVIRONMENT

[75] Inventors: William Barabash, Acton; Steven A. Kirk, Chelmsford; William S. Yerazunis, Marlboro, all of Mass.

[73] Assignee: Digital Equipment Corporation, Maynard, Mass.

[21] Appl. No.: 546,549

[22] Filed: Jun. 29, 1990

[51] Int. Cl.$^5$ ............................................. G06F 15/18
[52] U.S. Cl. .................................... 395/64; 395/60; 395/906
[58] Field of Search .................. 364/513; 395/62, 64, 395/76

[56] References Cited

U.S. PATENT DOCUMENTS

| | | |
|---|---|---|
| 4,649,515 | 3/1987 | Thompson et al. |
| 4,730,259 | 3/1988 | Gallant. |
| 4,754,409 | 6/1988 | Ashford et al. |
| 4,761,746 | 8/1988 | Tano et al. |
| 4,779,208 | 10/1988 | Tsuruta et al. |
| 4,809,219 | 2/1989 | Ashford et al. |
| 4,837,735 | 6/1989 | Allen, Jr. et al. |
| 4,849,905 | 7/1989 | Loeb et al. |
| 4,882,691 | 11/1989 | Schor. |
| 4,890,240 | 12/1989 | Loeb. |
| 4,937,760 | 6/1990 | Beitel et al. ................ 364/513 |
| 4,951,225 | 8/1990 | Lee et al. ................... 364/513 |
| 4,956,791 | 9/1990 | Lee et al. ................... 364/513 |
| 4,972,328 | 11/1990 | Wu et al. ................... 364/513 |

OTHER PUBLICATIONS

Charniak et al., Artificial Intelligence Programming 2nd Ed., Lawrence Erlbaum Assoc., 1987, Chapt. 12-248-275, Chapt. 13-276-303.

Forgy, C. L., "Rete: A Fast Algorithm for the Many Pattern/Many Object Pattern Match Problem", Artificial Intelligence 19, 1982, pp. 17-37.

Barachini, F., "Match-Time Predictability in Real-Time Production Systems", 1990.

Parson et al., "Constant-time pattern matching for real-time Production systems", SPIE vol. 1095, 1989, pp. 971-982.

IEEE Software, "Integrating Access-Oriented Programming Into a Multiparadigm Environment," Jan. 1986, pp. 10-18.

Primary Examiner—Michael R. Fleming
Assistant Examiner—Robert W. Downs
Attorney, Agent, or Firm—Kenyon & Kenyon

[57] ABSTRACT

A recticular discrimination network utilized in an expert system that permit read procedural attachments on working memory element slots using a gamma memory. The gamma memory is associated with one- or two-input nodes and stores references to the attached WME slot, use of which minimizes computation and interaction among data elements in a RETE-net.

33 Claims, 14 Drawing Sheets

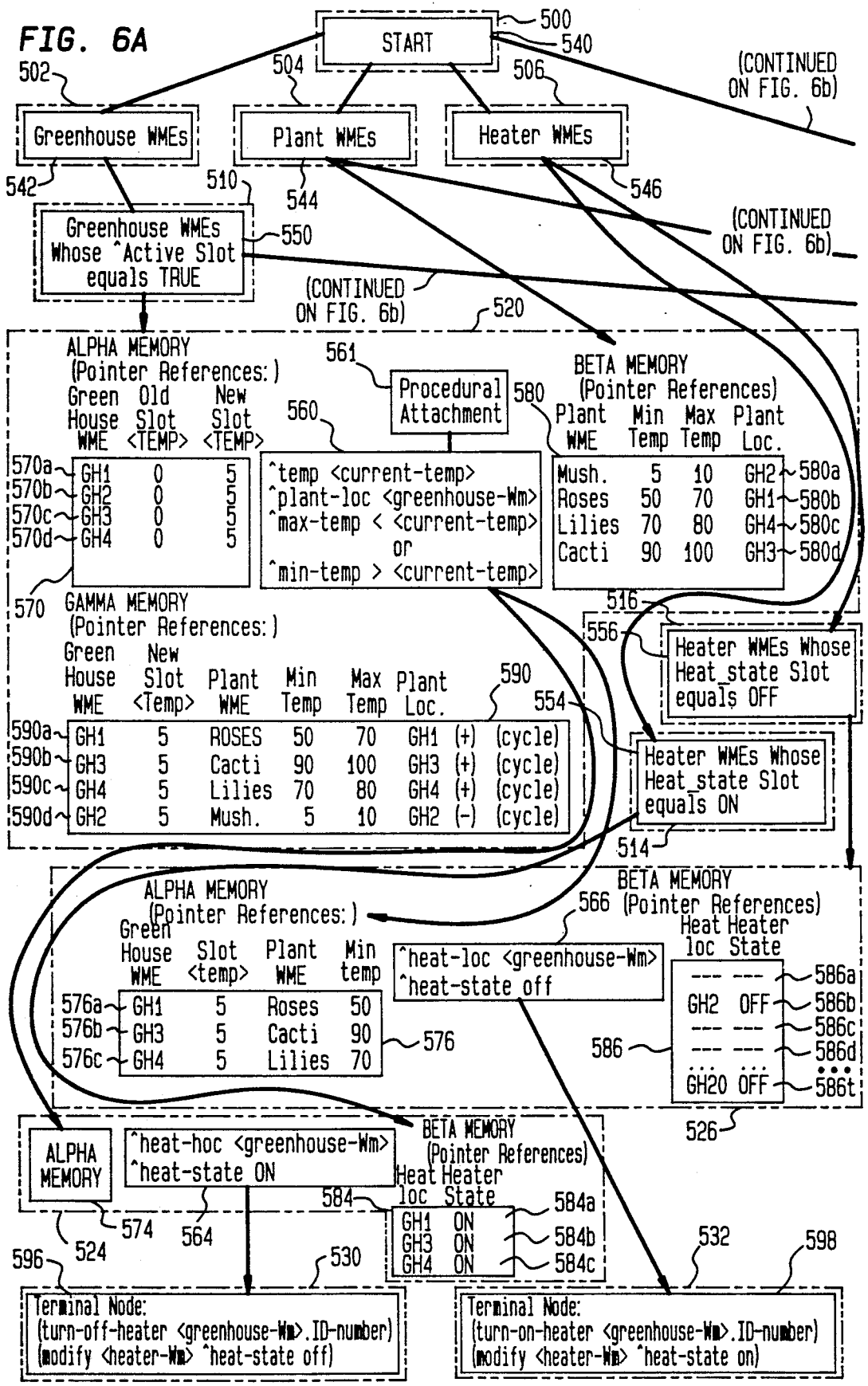

FIG. 6B
(continued from FIG. 6A)

548 — Humidifier WMEs — 508

518 — Procedural Attachment 559, 558 — Humidifier WMEs Whose Hum_State Slot equals OFF (Continued from FIG. 6A) 552 — Plant WMEs Whose Requires_humidity Slot equals TRUE — 512

GAMMA MEMORY
(Pointer References)
Hum Humidifier
loc <State> — 594

| | | | |
|---|---|---|---|
| GH1 | OFF | (+) | (cycle) | — 594a
| GH2 | ON | (−) | (cycle) | — 574b
| GH3 | OFF | (+) | (cycle) | — 594c
| GH4 | ON | (−) | (cycle) | — 594d
| ... | ... | ... | ... |
| GH20 | OFF | (+) | (cycle) | — 594t (Continued from FIG. 6A)

522

ALPHA MEMORY
(Pointer References:)

| Green House WME | Old Slot <hum> | New Slot <hum> |
|---|---|---|
| GH1 | >Low | >Low | — 572a
| GH2 | >Low | >Low | — 572b
| GH3 | >Low | >Low | — 572c
| GH4 | >Low | >Low | — 572d Attached Procedure — 563

572
562
plant-loc <greenhouse-Wm>
hum-level > <current-hum>

582

BETA MEMORY
(Pointer References)

| Plant WME | Req. Hum. | Plant Loc. |
|---|---|---|
| Roses | Low | GH1 | — 582a
| Mush. | High | GH2 | — 582b
| Lilies | Med. | GH4 | — 582c

GAMMA MEMORY
(Pointer References:)

| Green House WME | Slot <hum.> | Plant WME | Req. Hum. | | | — 592 |
|---|---|---|---|---|---|---|
| GH2 | >Low | Mush. | High | (+) | (cycle) | — 592a
| GH4 | >Low | Lilies | Med. | (+) | (cycle) | — 592b
| GH1 | >Low | Roses | Low | (−) | (cycle) | — 592c

528

BETA MEMORY
(Pointer References)
Hum Humidifier
loc State

| | | |
|---|---|---|
| GH1 | OFF | — 588a |
| --- | --- | — 588b |
| GH3 | OFF | — 588c |
| --- | --- | — 588d |
| ... | ... | |
| GH20 | OFF | — 588t |

588

ALPHA MEMORY
(Pointer References:)

| Green House WME | Slot <hum.> | Plant WME | Req. Hum. |
|---|---|---|---|
| GH2 | >Low | Mush. | High | — 578a
| GH4 | >Low | Lilies | Med. | — 578b 568
^hum-loc <greenhouse-Wm>
578

534

600 — Terminal Node:
(set-humidity-level <greenhouse-Wm>.ID-number)
(turn-on-humidifier <greenhouse-Wm>.ID-number)
(modify <humidifier-Wm> ^hum-state on)

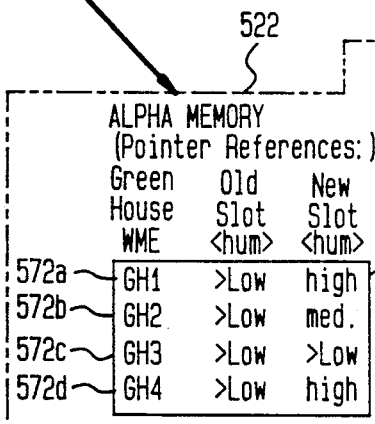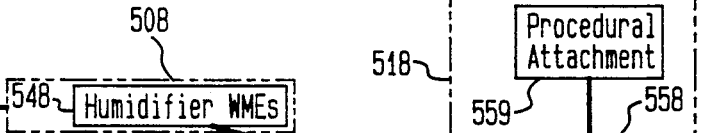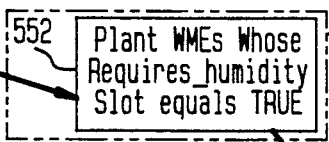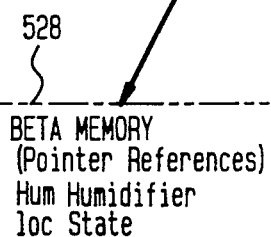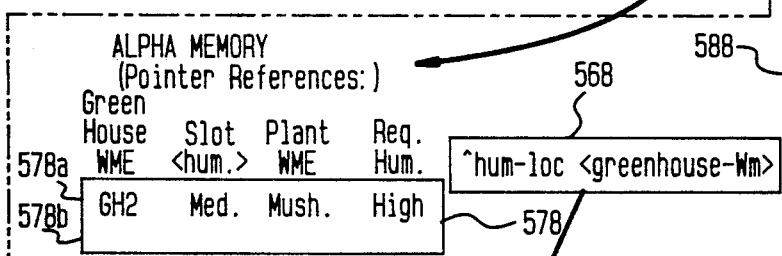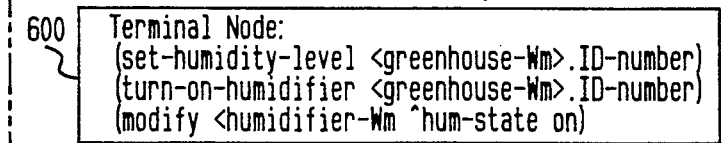

METHOD AND APPARATUS FOR EFFICIENTLY IMPLEMENTING READ-TYPE PROCEDURAL ATTACHMENTS IN RETE-LIKE PATTERN MATCHING ENVIRONMENT

FIELD OF THE INVENTION

This invention relates generally to the field of artificial intelligence, and more particularly to rule-based programmed computer systems that utilize reticular discrimination networks combining access-oriented programming techniques.

BACKGROUND OF THE INVENTION

Rule-based artificial intelligence systems, generally known as expert systems, typically comprise a set of rules, one or more facts or data in a working memory, and an inference engine that applies the rules to the facts in the working memory.

The basic computations performed by a rule-based artificial intelligence system are pattern matching searches among facts or data in working memory. Facts in working memory are organized into "Working Memory Elements" (WMEs). Each WME is a set of related facts or data, such as the address, age, and sex, of an individual. Each data entry in the WME comprises one or more data fields known as "slots". WMEs are identified by "class name"; slots are also identified by name (e.g. "employee").

A rule comprises a set of conditions and a set of action instructions to be completed, if a group of facts in working memory meet all conditions of a particular rule. A rule's condition set is commonly referred to as the "left-hand side" of the rule, and the action instruction set is commonly referred to as the "right-hand side" of the rule. If the conditions of a rule match the facts, the left-hand conditions are said to be satisfied and the right-hand actions are now ready to be invoked or "fired". Only when the left-hand side conditions of a rule are met will the right-hand side action instruction set be invoked.

A condition is a test comparing data items in working memory against other WME data, fixed values or variables. Condition tests can be created using one or more relational operators including but not limited to: "=" (equal to), "<" (less than), ">" (greater than), "<=" (less than or equal to), ">=" (greater than or equal to), and "<>" (not equal to). A condition identifies the facts to be tested in working memory by WME. Each WME is identified by a class name, and each slot is identified by a slot name. A condition identifies a WME by class name, one or more slots to compare by slot name, and, optionally, a set of relational limits or requirements to test the values in each selected slot. Rule conditions are linked by logical connectors such as, for example "and", and "or". A set of one or more conditions, linked by one or more logical connectors, comprises the "left-hand side" of a rule. Action instruction sets comprise operations to be performed when facts in working memory match the conditions of a rule. Those operations include, for example, the addition, deletion or modification of the facts in working memory. The operations can also include transmission of the results to a user.

Programmers use programming languages, such as, for example, the language known as "OPS5" to define and create rules and WMEs for expert systems. For further background information on OPS5, the reader is referred to the following publications that are hereby expressly incorporated by reference: *Programming Expert Systems in OPS5*, (Addison-Wesley Publishing Co., 1985); Charles L. Forgy, *OPS5-User Manual*, Technical Report CMU-CS-81-135, Computer Science Department, Carnegie Mellon University, Pittsburgh, Pa., July 1981. An example of a rule using the OPS5 language is:

```
(P Rule-Example
    (patient-data    AGE       <A>
                     HEIGHT    {<B> < <A>}
                     NAME      <N>)
    (monitor-data    NAME      <N>
                     PULSE     {<C> > <B>})
    -->
    (Write |Patient| <N> |is in critical
     condition|
    )
```

The left-hand side of the rule executes conditions on data of two WME classes. The first WME class, "patient data," has attributes "AGE," "HEIGHT," and "NAME" that are represented by the variables "<A>", "<B>", and "<N>", respectively. Those variables refer to the attributes of a specific patient. The second WME class, "monitor-data", has attributes "NAME" and "PULSE", represented by the variables "<N>" and "<C>", respectively. Those variables also denote attributes for the patient referred to in a WME definition.

The left-hand side of the rule above is satisfied when: 1) the name slot has the same value in both WMEs of class patient-data and monitor-data; 2) the patient's height is greater than the patient's age; and 3) the patient's pulse rate is greater than the patient's height. If it is determined that the left-hand side of the rule is satisfied, then the right-hand side of the rule can be executed. The message, "Patient [name (e.g. John Doe)]is in critical condition," is written to a device such as a display terminal.

Inference engines are comprised of data processing devices, such as a computer, and programmed elements or subroutines to perform a condition matching and "firing" sequence for each specified rule, using the facts in working memory. The condition-matching/firing sequence is sometimes referred to as a "recognize/act" cycle. "Recognize" refers to the left-hand portion of the operation, where the inference engine invokes subroutines of programmed elements to apply the conditions of the rules to the data in working memory to determine which, if any, rules to fire. "Act" refers to the right-hand portion of the operation, where the inference engine performs the action set specified in the rule (i.e. fires).

The inference engine performs left-hand condition testing by matching the data in working memory to the specifications of the condition test. In the comparison operation, the inference engine determines whether the named WME contains an entry whose slot values correspond to the slot values set forth in the condition. If so, the condition is satisfied. However, if working memory does not have an entry whose slot contains the values specified in the condition, the condition is not satisfied. To determine whether a rule will fire, the inference engine performs the existence test in connection with each condition in the rule.

Comparison or recognition tests can become more complicated when a rule contains one or more conditions with slot values expressed as variables. If a condition identifies a WME class and one or more slot values, at least one of which is specified by a variable, and the values identified for each of the other slot names match the values in the corresponding slots in the working memory entry, the condition is satisfied by each entry in the relation identified by the class name in which the variable is satisfied. In the case of a match operation for a condition with a variable, the inference engine establishes one or more binding lists for the variables, identifying the set of slot value in the various WMEs which can satisfy the condition. The values of the variables in each binding list are propagated through subsequent conditions.

One present problem in implementing rule-based expert systems is finding an efficient method to execute the many rules that would comprise a large expert system. One way that an inference engine can determine if the expert system rules' conditions are satisfied is to test each condition of each rule against data in working memory and track the rules whose conditions are satisfied. That method will affect many redundant comparisons because in many circumstances the same condition is included in many different rules.

Further, it is usually unnecessary to evaluate every WME against every rule during every recognitionact cycle. Instead, partial lists of rule matches can be maintained and incremental updates can be performed on those lists as relations are added, deleted or modified.

To avoid the necessity of testing and retesting conditions for each rule, the rules comprising an expert system can be organized into a "discrimination network", such as a "reticular" discrimination network, also known as a "RETE-net". A RETE-net comprises a series of interconnected nodes. The nodes are programmed elements representing facets of the user-defined rules. In a RETE-net, the conditions of all the rules are organized as a series of either one or two input "test" nodes.

A one-input test node accepts input from only one source and compares the input against constant or pre-defined variables. A one-input test node can be associated with different conditions found in a rule. For example, the condition "A<3" is represented by a one-input node referred to as a test node. A condition is represented by a single test node even if that condition occurs in the left-hand side of multiple rules.

One-input test nodes receive WME slot data, and compare the data against fixed values. Successful relation entries are passed as "tokens" by test nodes to respective superseding join nodes or test nodes.

The test nodes are interconnected by a series of two-input "join" nodes. Each join node represents a logical connection between the conditions found on the left-hand side of each rule.

Two-input nodes accept variable input from two different sources and compare the two different source inputs on pre-determined matching criteria.

Two-input join nodes maintain lists that record the set of WMEs data received by the node in memory. Because two-input nodes compare series of inputs against each other, the input is stored in memories. Unlike a one-input node which has no memory, join nodes comprise two associated memories known as "alpha" and "beta" memories—One memory collects and stores input from each of the nodes' feeding tokens.

Two-input join nodes represent a logical connection of two conditional expressions (e.g., (A<B) and (A>0)). "Beta" memory entries at any particular node represent a set of facts that satisfy the test conditions to the left of the logical connector represented by the join node. Entries in the "Alpha" memory represent conditions satisfy conditions the right of the logical connector represented in the join node.

A typical rule-based expert system includes a number of rules. A RETE-net created for an expert system will have a plurality of test nodes, one for each condition in the rules, so that if the same condition appears in multiple rules, the RETE-net requires only one test node to represent the condition. In addition, join nodes may be shared among rules if the same series of preceding join nodes and test conditions are used in multiple rules. Following a join node may be other test nodes, join nodes or a terminal node.

When WMEs are added to the RETE-net or when WME facts are modified, the changes are propagated through the RETE-net by tokens that are passed between test and join nodes. There are two types of tokens: add and delete tokens. Add-tokens signal to the node that evaluates the date referenced by the tokens that the value is new and must be processed against the rule conditions. A delete token signals to each node to delete any stored references to the data referenced by the delete token.

WME data is initially introduced to the RETE-net as a series of add-tokens. The first step is to pass the token to each test node, constructed to compare the data referenced. For each successful test, the testing node passes a token containing the data update to its successor. If the test fails using the new data, the data is not sent for further processing. This sequence of passing and testing the token continues until the token either fails a test or reaches a terminal node.

A rule is ready to be fired once a successful token reaches a terminal node. A terminal node comprises the right-hand side of the action instruction set that should fire when the left-hand side conditions of a rule are satisfied. Because a rule-based expert system typically comprises many rules, a RETE-net correspondingly comprises a number of terminal nodes. In a RETE-net, many terminal nodes can be ready to fire in the same cycle. Problems sometimes occur in ordering the sequence in which the inference engine will fire the terminal nodes. Some action instruction sets depend upon the results of the firing of other terminal nodes. The inference engine comprises in part, programmed elements or subroutines, known as "conflict resolution procedures" to select the order of terminal node firing.

As stated above, the action instruction set can cause changes to the working memory elements and thus change the state of the RETE-net. The changes may cause new rules to be satisfied on the left-hand side and ready to fire on the right-hand side. The changes may also cause other rules, previously satisfied on the left-hand side, to become false; its right-hand side now not ready to be fired. RETE-net expert systems employ conflict resolution modules to fire the single best rule in accordance with a fixed set of selection criteria known as the "conflict resolution strategy". The conflict resolution modules may re-arrange or cancel right-hand rule firings, depending on the re-evaluated state of the RETE-net.

A RETE-net is constructed by expressing the left-hand conditions of the rules of the expert system as a series of one- and two- input nodes, with the right-hand side action instruction set expressed as terminal nodes. RETE-nets are used by passing data through the series of nodes from node to node passing a data construct known as a token. Tokens contain pointers to both WMEs and WME slot data fields. A token is passed through the RETE-net in a top-down fashion wherein a token is first passed to RETE-net nodes that perform initial comparisons of the expert system's rules. As the data contained in the WME slots referenced by the token continue to satisfy the conditions of the rule, resident at each node, the RETE-net continues to pass tokens referencing the data into further levels of the RETE-net. If a token data reaches a terminal node, the data referenced satisfies all of the criteria of the expert system. The right-hand side of the rule will fire. To accomplish the building and updating of a RETE-net, traditional RETE-net nodes pass and accept two types of tokens—add and delete tokens. When information is newly added to the RETE-net, the addition of new information is propagated throughout the RETE-net by a series of add tokens which are created by each node when the input satisfies the node test.

However, when data in the RETE-net needs to be expunged, the data references are removed by a delete token. On receiving a delete token, each two-input node eliminates all data slots referenced by the token. The two-input node will also propagate a delete token that references the same WME to subsequent nodes in the RETE-net.

Traditional one-input nodes have no associated memories so the delete token received by a one-input node is simply forwarded to subsequent nodes.

Alterations to the data in a RETE-net is accomplished through a modification procedure. The alteration of data stored in a RETE-net is accomplished by first propagating delete tokens to remove the altered data references and then passing add-tokens referencing the data new input.

Traditionally, RETE-nets have not been applied to systems that process real-time data. A real-time system either guarantees a response to a change in critical data within a specific period of time, or simply guarantees a quick response. If there is a change in the facts in working memory, the inference engine must process those changes within a specified real-time period. Often real-time systems will quickly test data to determine if the change is "critical" and will continue with complex RETE-net processing only in critical cases. RETE-nets should respond to all data updates, not just critical changes.

Traditional RETE-nets are also ineffective in accepting real-time data input. Real-time data input, such as that from an environmental sensor, can create constant data changes. Most changes will be minor and incremental; most will not cause any rule to fire. Thus, there may be many inputs for a traditional RETE-net to process, but few inputs will cause right-hand side rule firing. However, even if there is no right-hand side firing caused by the incremental input, RETE-net state is constantly being updated. The inefficiency is due to the fact that the RETE-net nodes must constantly compare all values for even small changes in value.

In the past, programmers have employed various programming techniques to enhance real-time RETE-net performance. For example, RETE-net conditional test node structures have been modified to provide mechanisms that enable RETE-nets to respond only to critical changes in data, thereby preventing unnecessary data comparison and token passing. For further background on other techniques used to enhance RETE-net performance, reference can be made to pending U.S. patent application Ser. No. 499,039, filed Mar. 26, 1990 in the name of Ramakrishna, et al. entitled "A Reticular Discrimination Network for Specifying Real-Time Conditions", which is hereby expressly incorporated herein by reference.

Another problem is that the technique of procedural attachment has never been successfully applied to RETE-type pattern matching systems. Procedural attachment is the technique of automatically invoking user-defined functions whenever an access is made to a variable.

A procedural attachment is a set of instructions to be executed, whenever a designated variable is referenced. Procedural attachment programming techniques are based on an entity called a "procedurally attached variable" that associates the procedural attachments with data. For example, a variable "current-temp" can be associated with an attached set of instructions that will automatically execute whenever "current-temp" variable is referenced, such as, for example, printing the value of "current-temp" and the current time. Thus, a computer's execution of a program language statement:

current-temp > max-temp would cause the attached procedure to print all values of the current temperature until the current temperature has surpassed the max-temp value.

There are a variety of ways that procedural attachments can be attached to variables. A "write" procedural attachment comprises a set of instructions executed whenever an attached variable is written to. A "read" procedural attachment, described above, comprises a set of instructions executed whenever the value of an attached variable is referenced. A "modify" procedural attachment can execute a set of instructions whenever the value in the attached variable is modified.

Procedural attachment programming techniques have been developed for object-oriented systems but not RETE-nets. In object-oriented programming, data and instructions are combined into a single module of software known as an "object". Objects pass data and instructions between themselves, requesting information and giving instructions. For further background on the application of procedural attachment to object-oriented systems, reference can be made to Stefic, Bobrow and Kahn, "Integrated Access-Oriented Programming into a Multiple Paradigm Environment," *IEEE Software*, 10 (Vol. 3, No. 1 January 1986).

Reticular discrimination networks are similar to object-oriented systems in that rete-nodes pass tokens in a way analogous to how program objects exchange data and instructions. However, procedural attachment techniques can not currently be used successfully with reticular discrimination networks. The currently available methods of procedural attachment are either incompatible with RETE-type programming techniques or have large associated overhead, making procedural attachment techniques and computations very expensive to implement in RETE-net applications.

The problem of linking procedural attachments with RETE-net technology occurs with an attachment, known as a "read" procedure, being placed on variables that are evaluated as left-hand side conditions executed in RETE-net one-input and two-input join nodes. Others have attempted to provide procedural attachment techniques for left-hand side rule execution. Those attempts require repropagation and updating of all stored references to WME data on every cycle. That technique has an extremely high computational overhead and is, in a practical sense, unusable.

If procedural attachment techniques could be successfully applied in reticular discrimination networks, they would be especially useful in RETE-nets designed to interface with object-oriented languages, synchronize between WMEs and their expressions in external databases, and use RETE-nets to maintain a continuous watch on values supplied by external sensing devices.

Based on the foregoing, the structure of a RETE-net must be modified to allow an expert system to utilize procedural attachments in a practical manner.

SUMMARY OF THE INVENTION

The present invention is directed to a RETE-net arranged to provide mechanisms that enable "read" procedural attachments to be placed on WME slots accessed in left-hand side conditions. This new technique, generally referred to as "Gamma Memory", permits procedural attachments to be placed on RETE-net variables and reduces computational overhead to a much smaller amount than previous techniques.

With the present invention, it is possible to declare WME slot entries or whole WMEs as having a read or other procedural attachment, as, for example, a temperature probe to update a "currenttemp" WME slot. The attachment is a set of actions that fire automatically when the declared WME slot or WME is accessed.

All slots in a WME that are to have an attached read procedure are declared so before the creation of the RETE-net. Procedurally attached WME slots are called "live slots."

A computer processor generates code for each one- and two-input node that references a live slot. This generated node code supports three memories for two-input nodes and one memory for one-input nodes. In the past, node code has only supported at most two memories for two-input nodes—alpha and beta. One-input nodes previously had no associated memory ever. The present invention augments both one-input and two-input nodes with "Gamma" memory to cache partial node matches that fail solely due to slots with read procedural attachments.

For two-input nodes, the memories are as follows:
1) A "beta" memory that is used as in a known RETE-net;
2) An "alpha" memory that contains location entries of WMEs that pass the one-input conditions but with "live slot" tests ignored;
3) A "gamma" memory that contains location entries similar to the alpha and beta memory location entries, but of two memory types:
"+" location entries representing WME's whose live slot value caused a complete two-input match to succeed.
"−" location entries representing WME's whose live value caused a complete two-input match to fail.
Only the two-input nodes that test live WME slots have this gamma memory. Other two-input nodes are unchanged from the known RETE-net systems.

The computer generates similar code for each one-input node that references a live slot. This code supports a single gamma memory. In currently produced RETE-net technology, one-input nodes, i.e. test nodes, have no memory at all. One-input node gamma memory stores the same information as a two-input gamma memory. Each gamma token represents a WME that passed all the one-input (i.e. constant comparison) tests, ignoring the tests on live slots. "+" gamma memory entries represent WMEs that passed all comparison tests in the node, and "−" gamma memory entries represent WMEs that have passed all comparison tests in a node except for the live-slot tests.

For two-input nodes with gamma memory, an entry in the alpha memory alone means that the WMEs did not match, based strictly on the non-live slots. An entry in the gamma memory indicates that the WME must be reexamined because there is a possibility that the "live value" will change and the token must be repropagated.

WME data structures are relatively unchanged by the gamma memory. Slots that are declared "live" are still allocated storage. The current value of the live slot is kept in allocated storage and only updated when needed. There is also a memory location for each live WME slot where the recognize/act cycle number of the last update is placed.

During inference engine processing, the augmented node code performs as follows. For the alpha-side of a two-input node, the processor will scan beta-memory memory for possible matches on a given alpha input based on non-live slot comparisons. If there is a match, the inference engine will update the live slots using the procedural attachment and place a "+" entry in a gamma memory location if the match succeeds or a "−" entry in a gamma memory location if the match fails because of the live slot. The inference engine will propagate an add-token to the next node if the match succeeds.

For the beta-side of a two-input node, the inference engine will scan alpha memory for possible matches with beta input, based on non-live slot comparisons. If it there is an initial match, the inference engine will next update the live slots by firing the read procedural attachment and place a "+" entry in a gamma memory location if the match succeeds or a "−" entry in a gamma memory location if the match fails because of the live slot. The inference engine will propagate an add-token to the next two-input node if the match succeeds.

For one-input nodes, the inference engine will perform the constant tests on the non-live slots. If there is an initial match, the inference engine will update the live slot using the procedure attachment, and place either a "+" or "−" entry into the gamma memory, based on the live slot comparison result. The processor will propagate a normal one-input token to the next level if the match is successful.

At runtime, after rules have been determined ready to fire, but before conflict resolution, the present invention adds the following steps to handle variables with procedural attachments. First, the inference engine will scan all the gamma memories existing in any RETE-net nodes. For the WME data referenced by gamma, the inference engine will check a cycle update slot for each live slot referenced. If that slot has not been updated by procedural attachment during the current cycle, the inference engine will invoke the attached procedure. If the slot value has not changed the engine will move to the next gamma memory token. If the slot value has changed, new tokens may have to be propagated at the node of the updated slot. In general, a "+" token with a changed live value needs to be repropagated as a modified WME would be repropagated in that section of the RETE-subnet. A "−" token will, at most, require a modification propagation only in that section of the RETE-subnet.

Further, it is possible that the read and other procedural attachments of the present invention can be designed to be transparent to the writer and modifier of the rules. Since the intent would be for transparency, the procedural attachments could be implemented with no difference in rule syntax between normal and procedurally attached attributes of WMEs. There would be no program-accessible way to find out if its attribute has an attached procedure. This would be intentional; only those procedures that the programmer intends to happen every time, without fail and without recourse, would be placed in an attached procedure.

BRIEF DESCRIPTION OF THE DRAWINGS

FIG. 6a–6b: depicts a RETE-net of an expert system after rule firing.

FIG. 7a–7b: depicts a RETE-net of an expert system after procedural attachments on gamma memory values.

DETAILED DESCRIPTION

Figure 1:
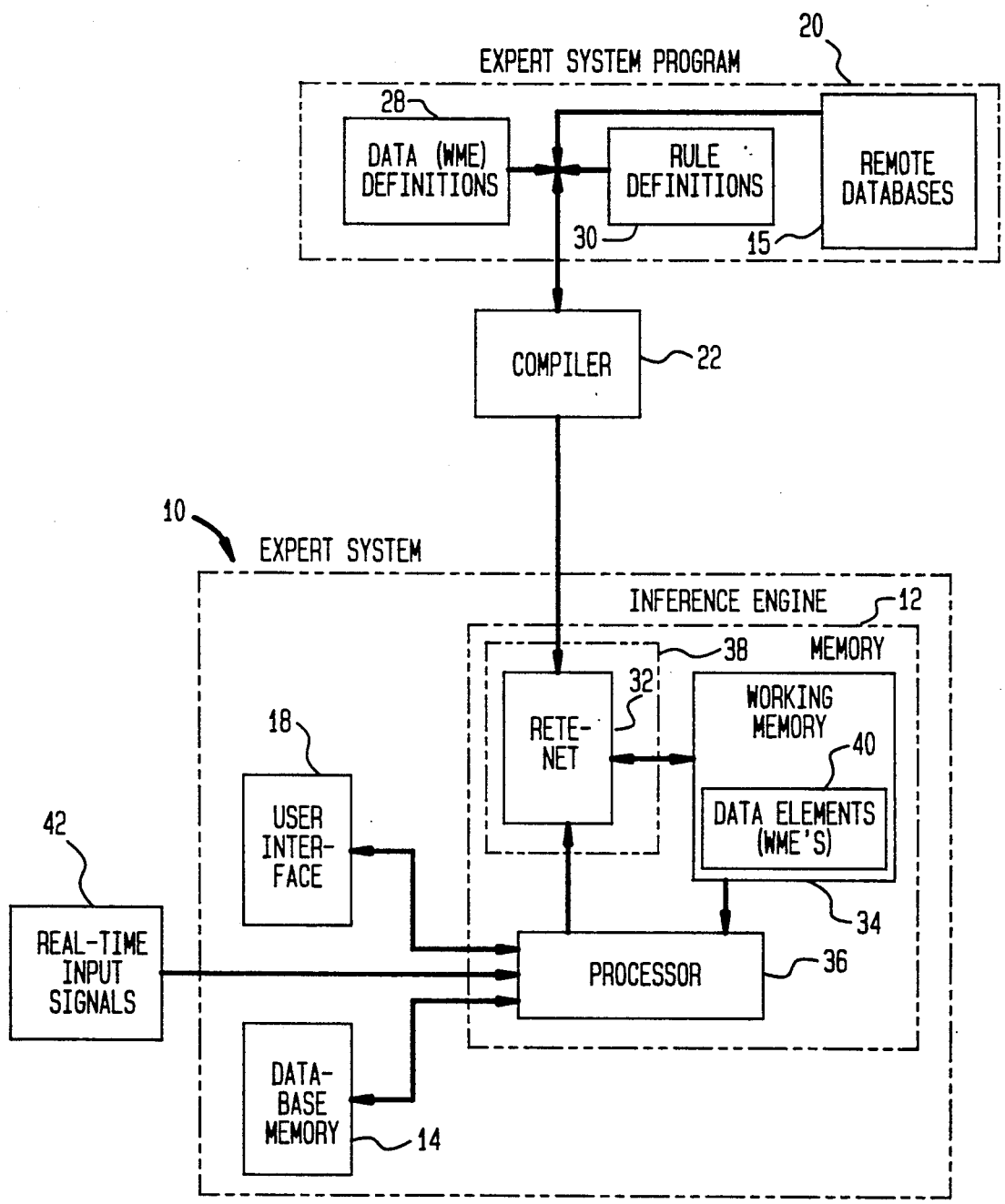
FIG. 1 depicts a block diagram of an expert system.

Referring now to the drawings, FIG. 1 depicts an expert system 10. The expert system 10 comprises an inference engine 12, database memory 14, and a user interface 18 The inference engine 12 is coupled to the database memory 14, a source for real-time input signals 42, such for example, an environmental sensor, and user interface 18.

An expert system program 20 and an expert system compiler 22 are also coupled to the expert system 10. The expert system program 20 comprises a set of data definitions 28, a set of remote databases 15, and a set of rule definitions 30. The data definitions 28 identify categories of data which the expert system program 20 uses during its operation. The set of rule definitions 30 are coupled to the set of data definitions 28. The data definitions 28 enable the rule definitions 30 to manipulate data. Data definitions 28 and rule definitions 30 are compiled by the compiler 22 and used to form in the inference engine 12 a discrimination net data structure known as a reticular net, i.e., RETE-net 32.

The expert system program 20 may also include links to other programs for performing tasks such as accessing remote databases 15 when called upon during the execution of the expert system program 20.

The inference engine 12 comprises a memory 38, a working memory 34, and a processor 36. The memory 38 and the working memory 34 are coupled to each other and to the processor 36. The RETE-net 32 created by the compiler 22 is stored in memory 38. Working memory 34 comprises a plurality of data organized as working memory elements (WMEs) 40 that are input to and output from the RETE-net 32 by processor 36. The processor 36 is coupled to user interface 18, real-time input signals 42, and the database memory 14.

The processor 36 obtains data from the database memory 14, the user interface 18, or the real-time input signals 42, by performing initial computations that are specified by data definitions 28 or by executing right-hand sides of rules. This data is stored in working memory 34 by processor 36 as one or more WMEs 40 (also referred to as data elements). A WME 40 identifies one or more data definitions and values for each definition. The data values in each WME are referred to as slots. A WME definition identifies all variables that are to be procedurally attached, and the procedural attachment actions.

In one embodiment, the inference engine 12, utilizes the processor 36 as a "generic" processor adapted to accommodate multiple applications. The inference engine 12 could be configured to have the memory 38 incorporated into the processor 36, thereby converting the processor 36 from a generic processor to a processor adapted to perform the specific function of the expert system 10. Furthermore, the expert system 10 could be arranged in a multiprocessor configuration utilizing a plurality of processors for processing the rules organized as RETE-net 32 as described in U.S. patent application Ser. No. 103,364, filed Sep. 30, 1987, in the names of William Barabash and William S. Yerazunis, entitled "Method for Operating a Parallel Processing System and Related Apparatus", which is hereby expressly incorporated herein by reference.

The RETE-net 32 in memory 38 comprises nodes that further comprise test nodes, i.e., one-input nodes, join nodes, two-input nodes, and terminal nodes, including the test and join nodes of the present invention and their associated gamma memories. The RETE-net 32 can be viewed as a data structure that has nodes which are either pointers to test functions, actual subroutines, or sections of a computer program. If the RETE-net 32 is viewed as a data structure, each test or join node has a pointer to other sections of computer program and join nodes to which the former test or join nodes will forward tokens containing pointers to WME slots that successfully pass a node test and pointers to access other WME information. The node tests may differ from case to case. One-input nodes perform single comparison tests such as (X>3). Two-input nodes perform list comparisons representing logical operations such as "and".

In operation, whenever new data elements 40 are stored in working memory 34, the processor 36 creates add-tokens for them and applies the tokens to the RETE-net 32 one at a time. Those tokens are processed by a process known as "matching" through the RETE-net 32 to determine if one or more rules are applicable to the data stored in working memory 34.

When a token is passed to a test node, a test is performed on the WME data contained in the slots referred to by the pointers in token. If the test is successful, an add-token is created and passed to successor nodes of the test node in the RETE-net 32. If the test is unsuccessful, the match fails and no further processing of the token occurs.

When a token passes to a traditional two-input join node, such as one embodying "AND" or "OR" logical connectors, the pointers to the WME data slots contained in the token are stored in a location in the alpha or beta memory representative of a test condition to the left or right side of the logical connector in the join node. The token pointers are stored for the purpose of matching the WME data slots with other WME data reference by pointers stored in the memory of the other side of the join node, or that will reach the other side of the join node in the future. If a token passes to a join mode and enters the join node on the beta side, the WME slots it references are compared to WME data slots referenced by the token pointers stored in alpha side locations of the join node. If the token is passed to the join node on the alpha side, the WME slots it references are compared to WME data slots referenced by the token pointers stored in the beta side of the join node. If a match is found, a new add-token, sometimes referred to as a "complex token", is created with pointers to represent the sum of the WME slots forming the match. This add-token is then passed on to successor nodes in the RETE-net 32.

After all left-hand side node matching is completed, add-tokens pass to terminal nodes. Terminal nodes are the RETE-net embodiment of the right-hand side of the rules defined in the rule definition nodules 30. Each token received at a terminal node represents an instance of the left-hand side conditions the terminal nodes' corresponding rule have been met. The tokens received at a terminal node represent a combination of WMEs 40 that satisfy the rule. The inference engine 12, pursuant to a conflict resolution scheme, will fire, i.e., execute, successful rules. If multiple rules are applicable, or if a single rule is applicable to more than one combination of data elements, the processor 36 performs conflict resolution to order the right-hand side rule firing, selects one or more of such rule "instances", and fires those rule instances.

The entire process from matching, conflict resolution, to the firing of rules is referred to as a "recognize/act cycle". The recognize/act cycle is to expert systems as an instruction fetch recognize and execute cycle is to traditional computer systems. In the recognition portion of a cycle, the system performs a matching process to recognize which rules' conditions are satisfied. This step is analogous to an instruction fetch where the computer fetches the next instruction to be executed. The "act" process occurs where the expert system determines which of the true rules to fire and then fires them. Analogously, after an instruction is fetched, the traditional computer executes the instruction fetched. The recognize/act process is continuously repeated just as the instruction fetch and execute process is continuously repeated. For further details on the recognize/act cycle, reference is made to U.S. patent application Ser. No. 364,021, filed Jun. 8, 1989, in the name of William Barabash and William S. Yerazunis, entitled "Expert System for Performing Beta-Token Partitioning in a RETE NETWORK" which is hereby expressly incorporated herein by reference.

The firing of a rule instance may cause several results. For example, it may create new data or cause the processor 36 to calculate a new value for an existing WME slot or to obtain more data from database memory 14, from user interface 18, or from the real time input signal device 42. Regardless of how data is acquired, i.e., whether created through a rule firing, execution of procedural attachments, collected in response to a rule firing or collected independently of the operation of RETE-net 32 through, e.g., real time input signals 42 or user interface 18, the processor 36 stores any newly acquired data as WME attributes 40 in working memory 34, creates add-tokens for these new data elements, and applies the new add-tokens to the RETE-net 32 to find a rule instance for firing. If the newly acquired data represents a change of WME value for which an add-token has already been created during operation of expert system 10, processor 36 applies a delete-token representing the old data value to the RETE-net 32, and then applies an add-token for the new data value. This process continues until no applicable rules are identified or until no WMEs 40 are generated, effected or obtained independently or as the result of firing the rules.

The efficiency of the RETE-net utilization is that nodes are shared among terminal nodes whose rule requires the test to be performed by that node. By sharing the results of tests, the repetition of the tests is minimized.

The present invention provides for procedural read attachments to be placed on WME variable slots. Procedurally attached WME slots are known as "live slots." The present invention augments a RETE-net with gamma memory to cache partial node matches that fail solely due to the data in the live slot. Left-hand nodes are of two input types: one-input and two-input nodes. Utilizing the present invention, both node types can process variables with procedural "read" attachments. Where those one-input and two-input nodes access live slots, they will have associated with them a gamma memory to facilitate efficient processing of read procedural attachments in a RETE-like pattern matching system.

Figure 2A:
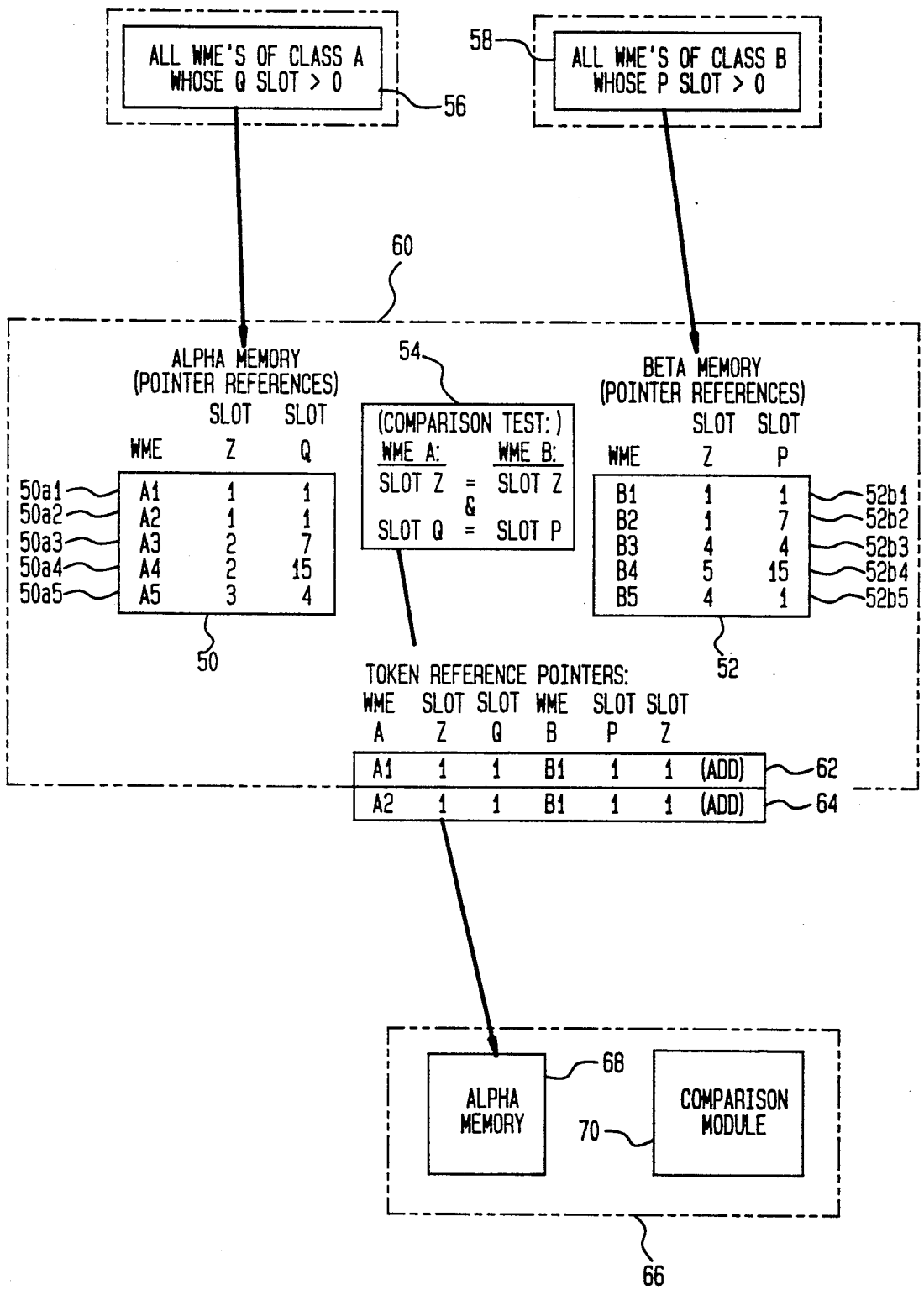
FIG. 2a: depicts a two-input node without gamma memory.

Typical use of one- and two-input nodes with and without the gamma memories is shown in FIGS. 2a-3c. The process flow of a typical RETE-net two-input node that does not access a procedurally attached variable is depicted in FIG. 2a. Referring to FIG. 2a, a typical join node 60 comprises an alpha memory 50, a beta memory 52 and a comparison module 54. The comparison module performs a matching operation on entries in the alpha 50 and beta 52 memories.

Entries in the alpha memory $50a1-50a5$ comprise pointers to WME data slots that were collected from tokens passed to the join node 60 from a left-hand node 56 that is higher in the RETE-net. Entries in beta memory $52b-52b5$ comprise pointers to WME data slots deposited in the memory by a right-hand node 58 higher in the RETE-net. Alpha- memory locations $50a1-50a5$ and beta memory locations $52b1-52b5$ comprise pointers to WME data slots collected from tokens created after successful tests in nodes at higher levels in the RETE-net.

In the example of FIG. 2a, the alpha memory 50 contains pointers to WMEs of type "A" whose slot "Q" is greater than zero as was tested in node 56 above. The values in the join node's 60 alpha memory are pointers to WME data slots of all "A" WMEs whose Q slots contain values greater than zero. Each alpha memory location in this example also contains pointers to the WMEs Q slot value and a "Z" slot value that will be compared.

Beta memory 52 contains pointers to WMEs of type "B" whose slot "P" is greater than zero as was tested in node 58 above. The join node 60's beta memory 52 contains pointers to all B WMEs whose P slots are greater than zero. Each beta memory location 52 in this example also contains pointers to the B WME's Q slot value and a "Z" slot value that will be compared by the comparison module 54 in join node 60.

The comparison module 54 matches references in alpha and beta memory entries e.g. 50a1-50a5 and 52b1-52b5, according to the matching criteria based on the programmer written rules. In the example of FIG. 2a, the comparison module 54 searches for instances where WMEs of class A have a Z slot value equal to the Z slot value of B WMEs and WMEs of class A have a Q slot value equal to the P slot value of B WMEs. In the example, two matches exist. The references of alpha memory locations 50a1 and 50a2 match the references of beta memory location 52b1. The join node comparison module 54 builds add-tokens 62 and for each match. Each token 62, 64 comprises pointers to the WMEs element of class A and class B WME match and pointers to the common matched values of the Z and Q and P slots. In addition there is a token operation indicator (e.g. "add"). Those tokens are passed by the comparison module 54 to a subsequent node or a terminal node. In FIG. 2a the data contained by the tokens 62, 64 will be added to the alpha memory 68 of a subsequent join node 66. The comparison module 54 will write the tokens into the alpha memory 68 associated with the subsequent join node 66. A comparison module 70 of the subsequent join module 66 will perform matching comparisons in the method similar to the comparison module 54 described.

Figure 2B:
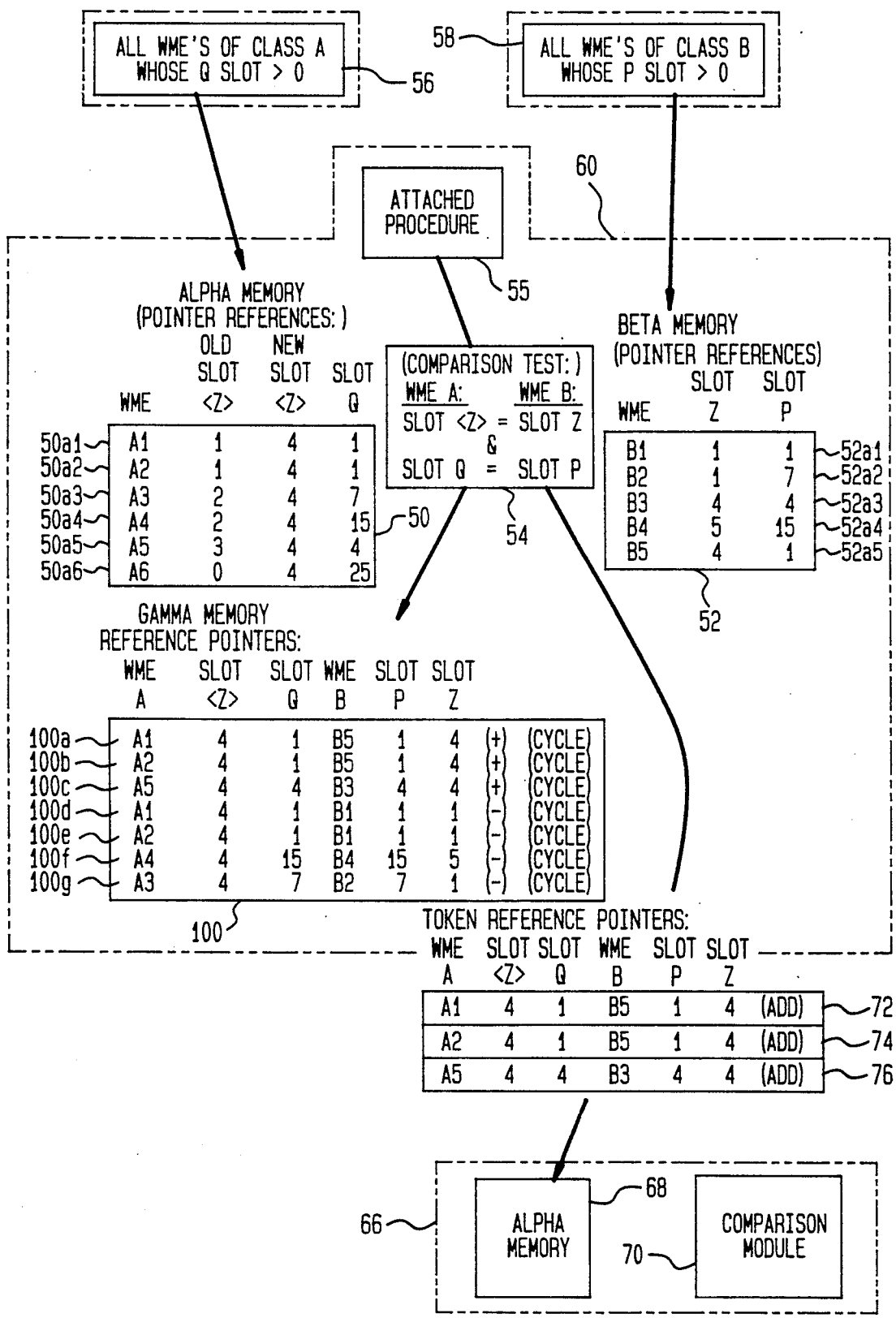
FIG. 2b: depicts a two-input node with gamma memory.

FIG. 2b, however, depicts the typical process flow for a join node that compares a live slot and has a gamma memory. The join node 60 will now be comprised of a gamma memory 100, in addition to the alpha memory 50, beta memory 52 and the comparison module 54. Further, the join node 60 will also comprise a procedural attachment module 55 to perform the procedure attached to the variable. The node code of the comparison module 54 is also augmented to facilitate processing of the procedurally attached <Z> value. For purposes of this example, assume that the slot Z marked as "<Z>" in the WME A is live. Assume that <Z> is attached to the procedure 55 that will update the value of <Z> with a reading from an environmental sensing probe, whenever that slot <Z> is accessed.

Notice that while the <Z> value of WME of A is procedurally attached, the Z value of WME's of type B is not procedurally attached.

As in FIG. 2a, in FIG. 2b the test nodes 56 and 58 at the level previous to the gamma memory join node 60 feed tokens the data from which are placed into locations in join node 60's alpha 50 and beta 52 memories. No data from those tokens are initially stored in the gamma memory 100.

The comparison module 54 begins the comparison evaluation by first making all comparisons involving WME slots that are not updated by the procedural attachment. Each entry in an alpha memory location (50a1-50a6) is compared against entries in each beta memory location 52b1-52b5. In the example depicted in FIG. 2b, the Q slot in WME's of Class A is compared for equivalence against the P slot in WME's of Class B. There are seven initial matches based on equivalent values of Q and P: 50a1 matches 52b1; 50a1 matches 52b5; 50a2 matches 52b1, 50a2 matches 52b5; 50a3 matches 52b2; 50a4 matches 52b4; and 50a5 matches 52b3; based on the WME A slot Q and the WME B slot P values referenced in the alpha and beta memory entries. Only one Q slot referenced in alpha location 50a6 has no equivalent matching WME B P slot in any of the P slots referenced by pointers in the beta memory locations.

For the initial matches, the comparison module 54 will fire the read procedural attachment module 55 to update the <Z> slots referenced in the alpha memory entries. In the example, the new <Z> value is 4. The new value is written to the WME slot and the number of the cycle is also stored in a special WME cycle update slot. Using this new <Z> value, the comparison module 54 performs the second comparison alpha 50 and beta 52 memory matching on the initial matches as described in the comparison test. In the example of FIG. 2b, three matches exist. The alpha memory tokens 50a1 and 50a2 match beta memory token 52b5. In addition, the alpha memory token 50a5 matches beta memory token 52b3.

For those three matches, the compiler 22 will build add-tokens 72, 74 and 76 to pass to node 66. The add-tokens represent WME data instances whose live value caused a complete two-input match to succeed. The add tokens 72, 74 and 76 will each comprise a memory element with six pointers to WME elements representing the match: the WME identification numbers for the WME of class A and of class B and the common matched values of Z and Q and P. Those tokens 72, 74 and 76 are next passed by the comparison module 54 to a another left-hand side comparison node, such as node 66, or a terminal node. A comparison module 70 of the subsequent module 66 will perform matching comparisons using the token data.

In addition, the node code of comparison module 54 is augmented to store in gamma memory 100 the results that succeeded or failed only because of the comparison involving a slot that has been updated by a read procedural attachment.

Of the initially successful matches, four failed only because the comparison involving the <Z> slot of the A WME. For each of those failed matches, the comparison module 54 writes data concerning the matches to locations in its gamma memory 100c-g. The gamma memory contains pointers to the A and B WMEs involved in the comparison as well as pointers to the <Z> and Q slots in the A WME and the Z and P slots in the B WME. In addition, the gamma memory location for each failed match will contain a "−" indicator showing that the potential match failed only because of the value contained in the <z> slot.

For each of the three successful comparisons, the comparison module 54 also stores pointers referencing data on the matches as well as a "+" indicator to show that the matches were completely successful 100a-100c.

The gamma memory entries also contain references to a special WME slot that contains the recognize/act cycle number of the last firing of the read procedural attachment.

In the typical situation depicted in FIG. 2a, once the matching comparisons are completed by the comparison module 54 there will be no more propagation of tokens unless there is either a modification, deletion or alteration of the WME data slot values compared. In known RETE-nets, modification, deletion or alteration information is accomplished by first passing delete tokens through the RETE-net to eliminate the old values stored in the alpha, beta or gamma memories. With this step, a deletion procedure is complete. In modification or alteration operations, however, a second step is acquired where a second add-token containing the newly altered or modified information is passed through the RETE-net.

In the example of FIG. 2b, the WME slot values referred by single alpha memory location 50a6 was not matched or used to create either a "+" or a "−" gamma memory location. The WME value referenced only in an alpha or beta memory location of a join node that accesses a live slot means that the WME slot value did not match criteria based strictly on non-live slot comparison.

In the example of the traditional join node depicted in FIG. 2a, the only time the comparison node will reevaluate the alpha and beta memories and repropagate tokens is when it receives either a new add or delete token as input. The present invention augments the RETE-net by providing code to update the live slot values every cycle or during conflict resolution and use the new values to update the RETE-net state.

Figure 2C:
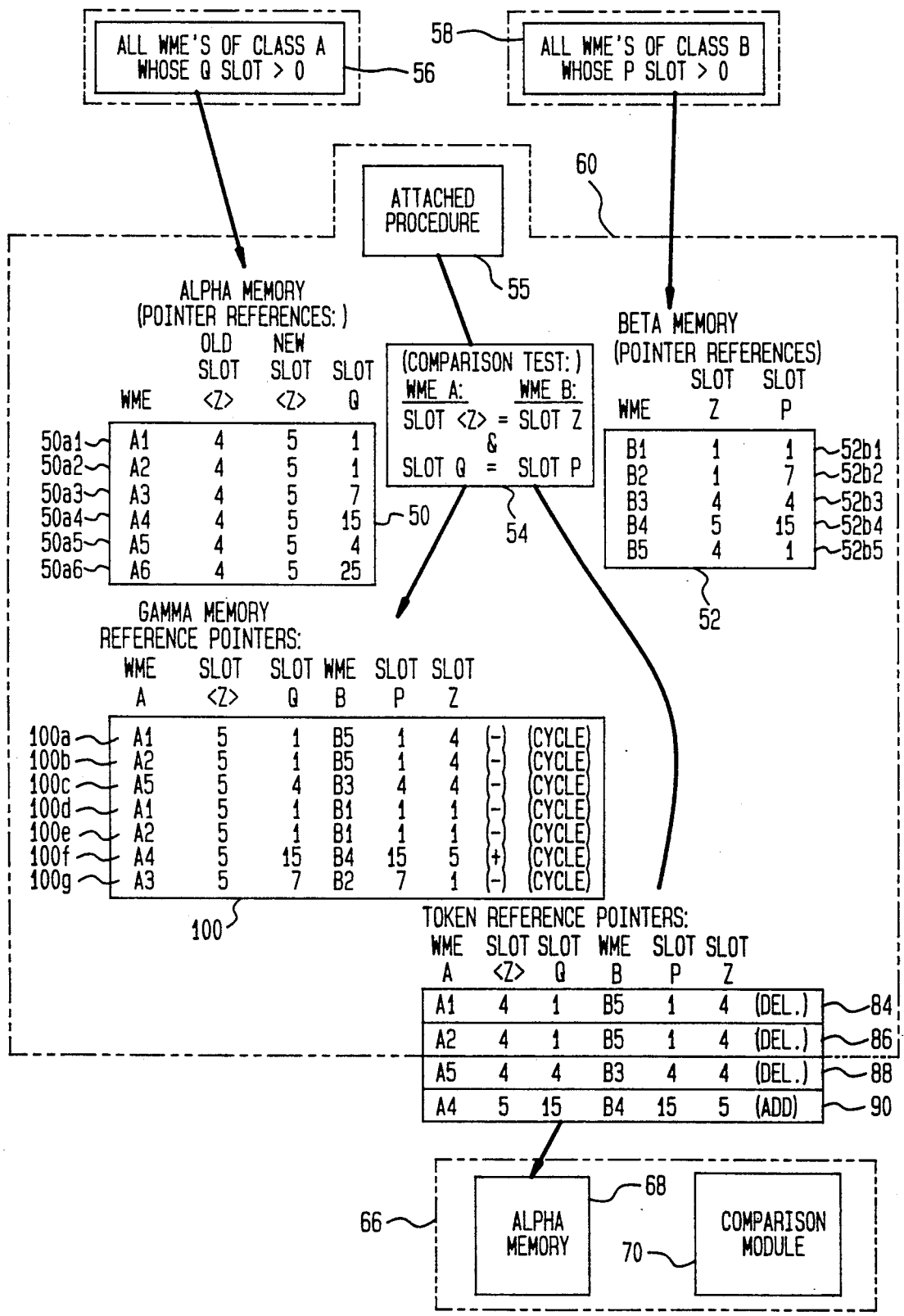
FIG. 2c: depicts the state of a two-input node after a procedural attachment update.

FIG. 2c depicts the process flow of a subsequent cycle to update the nodes that use attached read procedures. The comparison module 54 will first scan the gamma memory 100. If there are filled locations in the gamma memory 100, the comparison module 54 will first check the cycle time tag slot to determine if the value should be updated and then fires the procedural attachment 55 for the live slot. The comparison module writes the new value to each WME slot referenced by each gamma memory location. Assume in FIG. 2c that the cycle time tag slot shows that the <Z> slots referenced by gamma memory locations have not been updated during the current cycle. If the live slot values have not been updated during this cycle, the comparison module 54 will update the live slot in each gamma memory location and mark the cycle time tag slot appropriately. If the value of the slot has not changed, the comparison module will move on to the next slot referenced in the gamma memory. However if the live slot value has changed, the comparison module will perform the node comparisons based on the updated value in the procedurally attached slot and initiate add or modify or remove tokens to be passed to subsequent test nodes.

In FIG. 2c, the <Z> live slot value update is 5, changing the current <Z> from 4. The gamma nodes 100a, 100b, 100c no longer represent matching instances of the node's comparison test as those entries did in FIG. 2b. For those tokens, the comparison module 54 will build "−" gamma memory entries and also initiate a modification procedure to amend subsequent downstream nodes. Gamma memory locations 100d, 100g remain "−" locations, even with the change to the <Z> live slot update. However, the gamma WMEs referenced in gamma memory location 100f now match. The comparison module will update that gamma location, changing it to a "+" location. In addition, the comparison module 54 will propagate an add-token 90 and forward it to the subsequent node 66.

Figure 3A:
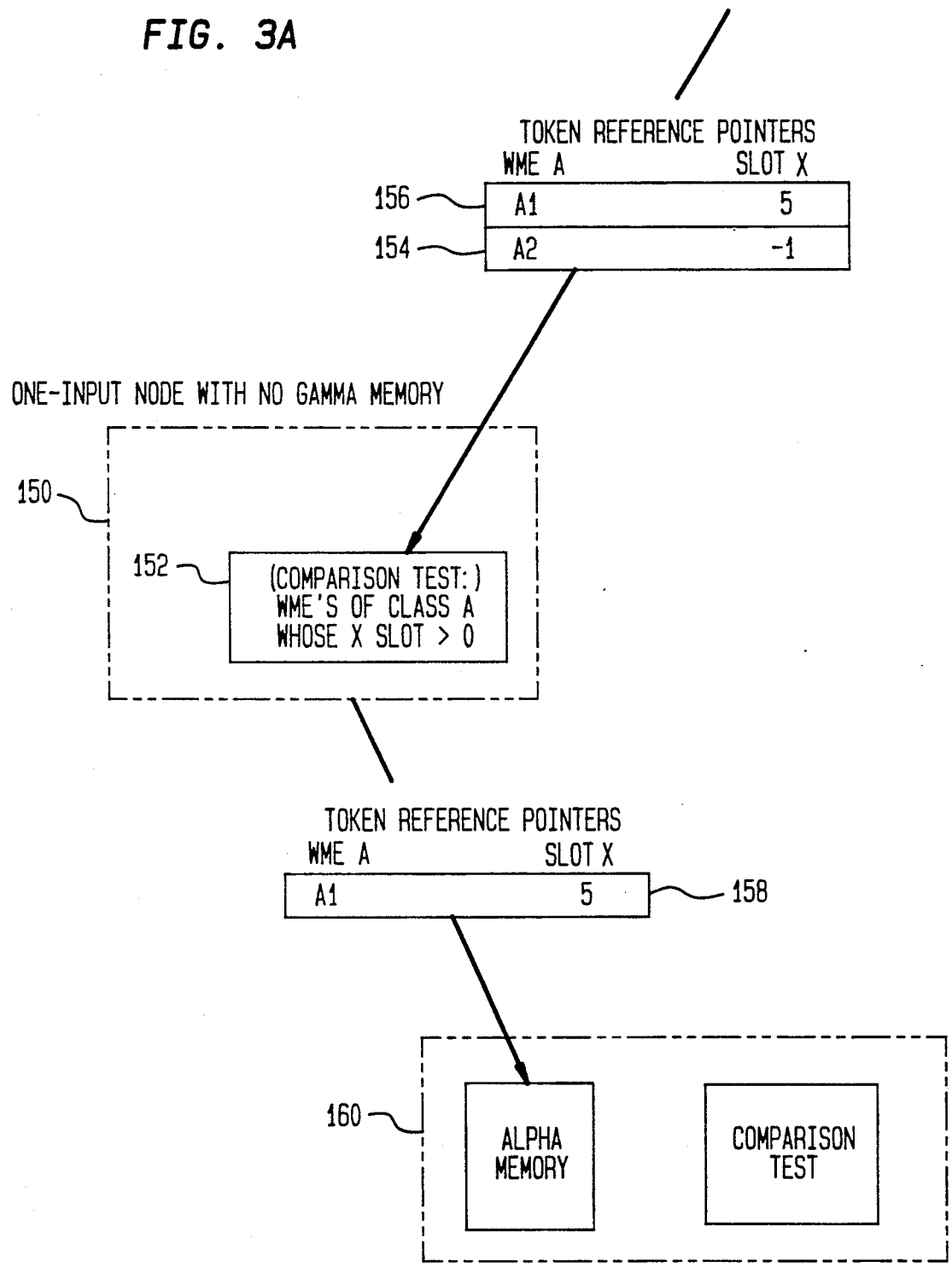
FIG. 3a: depicts a one-input node without gamma memory

FIG. 3a depicts the process flow for a typical one-input node 150 that does not evaluate a procedurally attached WME slot, that is a traditional one-input node with no associated memories. The one-input node 150 comprises a comparison module 152. The comparison module 152 receives data input in the form of tokens 154 and 156 and compares the WME value slots referred by those tokens against its constant comparison test (i.e. WME class A slot X is greater than zero). In the present example, token 154 fails that test. The token is disregarded by the node. the second token input references an X slot value of 5—that slot passes the test. The comparison module 152 creates add-token 156 and passes it to subsequent test node 160.

Figure 3B:
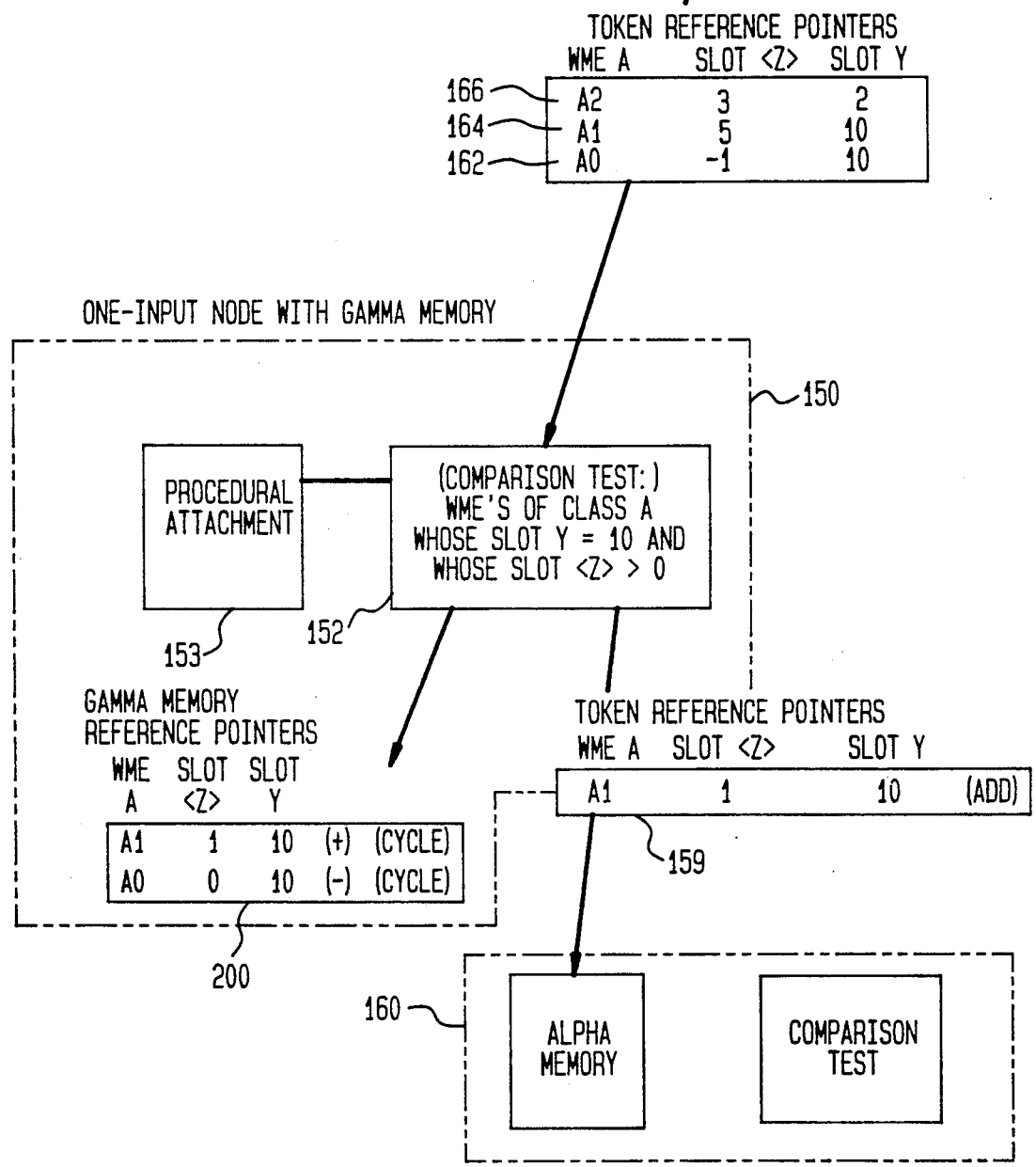
FIG. 3b: depicts a one-input node with gamma memory.

FIG. 3b depicts the process flow of a one-input node that references a live slot. Traditional one-input nodes have no memory associated with them. The present invention augments one-input RETE-net test nodes by associating a gamma memory 200 with each one-input node that references a procedurally attached slot. In addition, the node code is augmented to access a procedural attachment module 153 to perform the read procedure to update the <Z> slot.

In the example depicted in FIG. 3b, attached to the <Z> slot in WMEs of class A is a read procedure that updates the value of <Z>. For a token to successfully pass the one-input node test in FIG. 3b, each WME of class A must have a <Z> value greater than zero and a Y value equal to ten.

For each add-token that is passed to the one-input node 150, the comparison module first performs the comparisons involving WME slots that are not updated by the read procedural attachment, (i.e. Y=0) and then fires the attached procedure 153 only on WME data that satisfies the initial non-live criteria. When token 162 arrives, Y slot value is equal to ten, passing the initial non-live test. However the attached procedure returns an <Z> update value of zero. The data passed by token 162 fails the comparison test only because of the live <Z> slot value. The comparison module 152 will not forward the token to the subsequent node 160 but will create a "−" location entry 200a in the node's 150 associated gamma memory 200. The comparison module 152 next receives the token 164. When the Y value of the WME A referenced by token 164 is ten and the attached procedure returns an updated <Z> value of one. The WME values referenced by token 164 satisfy the comparison test. The comparison module 152 will build an add-token 159 containing the results after test. The add-token is passed as output to subsequent node 160, and in addition pointer data will be written to the gamma memory 200 as "+" gamma memory location entry 200b.

When add-token 166 arrives for evaluation, the comparison module 152 determines that the non-live slot of the referenced WME A having a value of two, fails the initial node test (Y=10) and processes the token input no further. In this instance the read procedure is not fired, and no pointer data from the token is stored in the gamma memory 200.

Figure 3C:
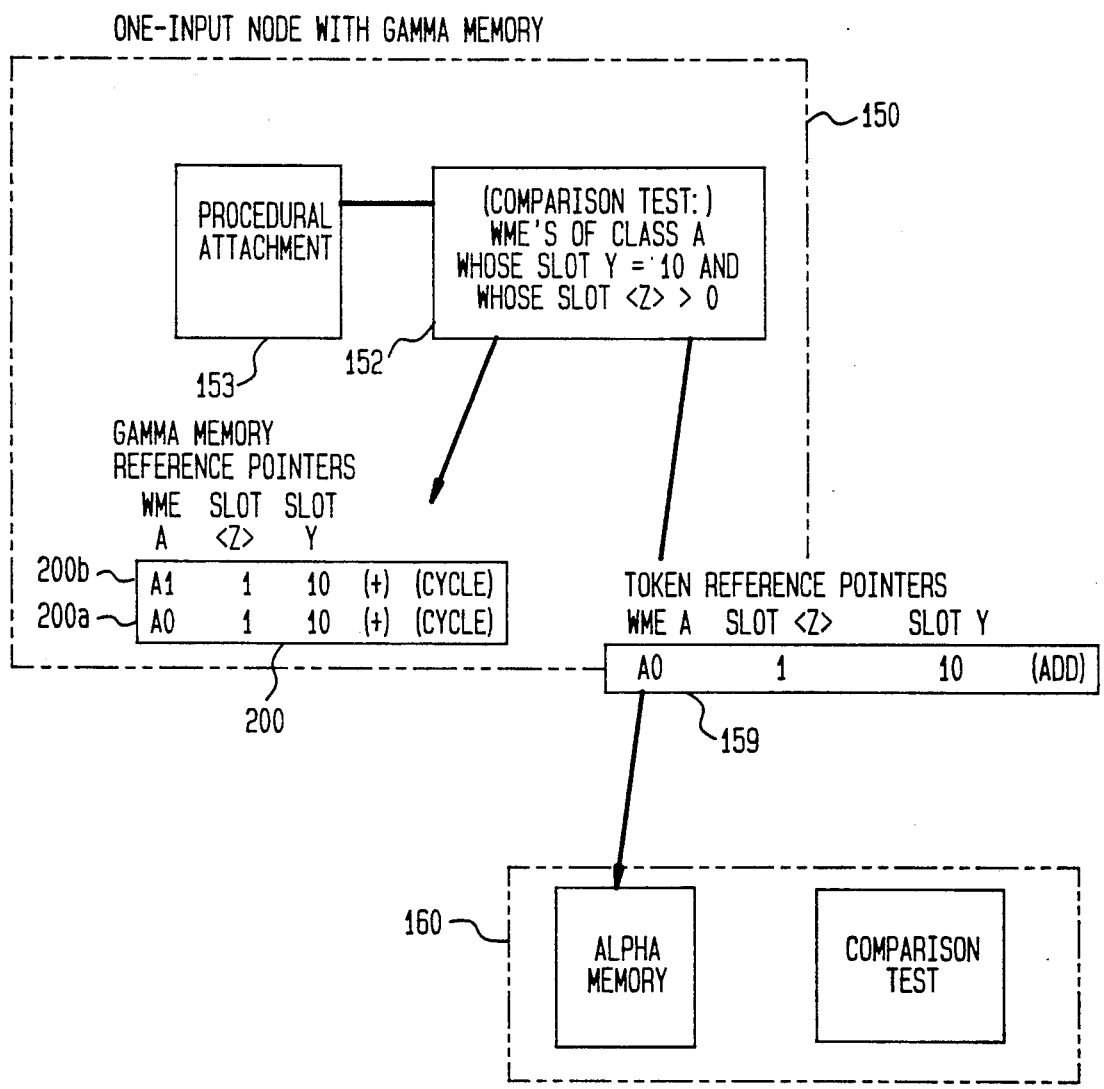
FIG. 3c: depicts a one-input node state after an attached procedure updates a variable.

In subsequent processing cycles, the gamma memory tokens associated with the one-input node will be reevaluated, as were the gamma memories of the two-input nodes described above in FIG. 2c. FIG. 3c describes the process flow of a one-input node with gamma memory during subsequent processing. The comparison module 152 will scan each gamma memory location 200a, and 200b, and fires the attached read procedure 153 for the <Z> slot, if <Z> has not been updated during the current cycle. Assume that the procedural attachment updated value is returned; it is one. For the WME data referenced at gamma memory location 200b there is no change; the comparison module will only update the cycle time tag slot to the current cycle and move to the next token. For gamma memory token 200a, the updated <Z> value now allows the WME data referenced by the location to satisfy the one-input node comparison test as its Y slot is equal to 10 and <Z> is greater than zero.

The comparison module 152 changes the "—" gamma memory entry 200a to a "+" gamma entry and propagates an add-token to the node 160 at the next RETE-net level.

In general, where a "+" gamma memory location entry needs to be repropagated of then a read procedural update, only that section of the RETE-subnet needs to be modified. A gamma memory "—" token update will also require only a modification in that section of the RETE-net. In the general case, simply retriggering a modify procedure on an effected WME will provide most of the benefits of the invention. A slight optimization is possible by not doing a full modify repropagation on the whole RETE-net but only on those sections of the net below the special gamma memory nodes.

Read procedural attachment, implemented in RETE nets using gamma memory in one- and two-input nodes have many applications in RETE-nets configured as expert systems. An example of a problem in which an expert system may be used is now presented to further illustrate the read procedural attachment implementation of the present invention. This example is just one of the many uses for the present invention.

Suppose that the expert system 10 of FIG. 1 was used to monitor and control the temperature and humidity conditions in one or more winter greenhouses. Assume that there are plants of different species growing in a number of different greenhouses, owned by a flower growing and vending company. A greenhouse can be in use or not, and when a greenhouse is in use, i.e., active, only one species of plant is grown in it. For example, all roses of a certain species could be located greenhouse number one, while mushrooms could be grown in greenhouse number two. However, cacti of a specific genus and species could be grown in greenhouse number three and lilies could be grown in greenhouse number four.

To provide optimal growing conditions, the workers at the flower growing company control the temperature and humidity in each greenhouse. For each plant species, there is an optimal range of temperatures and humidity between which the plants grow "best". A problem for the workers at the exemplary plant growing company has been controlling the temperatures at each of the greenhouses to keep them within the optimal ranges for the different plants.

Each greenhouse is equipped with devices to enable the workers to control temperature and humidity conditions within. An industrial space heater that can be turned on and off is located in each of the greenhouses. Each greenhouse also contains a humidifier. The humidifier can be set to saturate the air to a predetermined humidity level. When the air reaches a desired level, the humidifiers in each greenhouse will automatically shut off. The heaters in each greenhouse, on the other hand, do not shutoff automatically, they must be turned off with an input signal.

Using the present invention, the expert system 10 of FIG. 1 can be configured to optimally control the humidity and temperature in each of the greenhouses described above. Data definitions 28 would include the four following WME class definitions as written in a rule based programming language:

```
(WME- CLASS greenhouse
        ^ID-number      INTEGER
        ^active         SYMBOL DEFAULT false
        ^temp
            (ON-READ
                (modify <WME> ^temp (probe-
                    temp-sensor <WME>.ID-number)))
        ^humidity
            (ON-READ
                (modify <WME> ^humidity
                    (probe-humidity-sensor <WME>
                    .ID-number)))
)
(WME- CLASS plant
        ^plant-species     SYMBOL
        ^max-temp          FLOAT
        ^min-temp          FLOAT
        ^requires-humidity SYMBOL DEFAULT false
        ^humidity-level    FLOAT
        ^plant-loc         WME-ID OF greenhouse
)
(WME- CLASS heater
        ^heat-loc          WME-ID OF greenhouse
        ^heat-state        SYMBOL DEFAULT off
)
(WME- CLASS humidifier
        ^hum-loc           WME-ID OF greenhouse
        ^hum-state         SYMBOL DEFAULT off
            (ON_READ
                (modify <WME> ^hum_state
                    (probe-humidity-state-
                    sensor <WME>.hum-loc
                    <WME>greenhouse.ID-number))))
```

The data definitions 28 comprise four different WME classes (i.e. greenhouse, plant, heater and humidifier), representative of the elements to be controlled by the expert system. The database memory 14 contains the working data that will be organized into WMEs having the structures of the above four classes.

The "greenhouse" WME class comprises four slots, two of which have declared read procedures attached to them. The " ^ID-number" and " ^active" slots have no attachment. For each WME of the class greenhouse, the " ^active" slot will indicate whether or not there are plants growing in that specific greenhouse. The temperature and humidity conditions in unoccupied greenhouses need not be controlled. The ID-number slot contains an identifier for each greenhouse.

The temperature slot, " ^temp" will be updated by a read procedural attachment. When this variable is accessed in the left-hand side of a rule, the read procedural attachment defined in the WME will fire. The present invention provides that the read procedural attachment is defined as an attribute modifier in the WME-CLASS declaration with the new clause starting with "ON-READ". The associated actions have the same format and restrictions as the usual right-hand side action instruction set. All slots that have read attachment procedures, (e.g. WME greenhouse "^ temp" and "^ humidity" slots) must be declared so in the data definitions 28. Declared slots with read attachments are referred to as live slots.

" ^ humidity" is another slot that will be updated by a read procedural attachment. At the time the ^ humidity variable of the greenhouse class is accessed in a left-hand side comparison operation, the attached procedure will fire. In this example, the attached procedure will fire a probe-humidity-sensor routine to modify the humidity slot during evaluation by a node.

WME slots are not the only data constructs that can be updated by read procedural attachments. For example, the following arguments and, through indirect access, all declared attributes of the WME are accessible within a read attachment:

| | |
|---|---|
| <WME> | The WME itself, bound as a WME variable; |
| <OLD> | The old value of the attribute; |
| <ATTR> | The name of the attribute; |
| <RULE> | The name of the rule that tests the attribute. |

The WME class "plant" has no slots with attached procedures. The slots in that WME class identify the species of the plant, the location of the greenhouse where those plants are growing, and the temperature and humidity needs of that particular species.

The WME class "heater" also contains no slots with attached procedures. The " ^ heat-state" slot contains a truth value describing whether or not the heater is on. The "heat-loc" slot contains the WME-ID of a WME of class greenhouse corresponding to the greenhouse in which the heater is located.

A read procedure is attached, however, to the " ^ humstate" slot of the WME class "humidifier". When the hum-state slot is accessed in a left-hand side evaluation, the attached procedure to probe the humidifier state will execute and update the value of the slot.

In the rule definitions module 30 of the expert system program 20 depicted in FIG 1, reside the comparison routines and rules to run the system. The program is comprised as follows of seven external procedures to control the external devices by sending and receiving real-time input signals 42:

(EXTERNAL-ROUTINE
  probe-temp-sensor(ACCEPTING LONG)
  (RETURNING SINGLE-FLOAT))

(EXTERNAL-ROUTINE probe-humidity-sensor
  (ACCEPTING LONG)(RETURNING
  SINGLE FLOAT))

(EXTERNAL-ROUTINE
  probe-humidity-state(ACCEPTING
  LONG)(RETURNING SINGLE-FIXED))

(EXTERNAL-ROUTINE
  turn-off-heater(ACCEPTING LONG))

(EXTERNAL-ROUTINE
  turn-on-heater(ACCEPTING LONG))

(EXTERNAL-ROUTINE
  set-humidity-level(ACCEPTING LONG))

(EXTERNAL-ROUTINE
  turn-on-humidifier(ACCEPTING LONG))

In addition, the rule definition memory 30 of the expert system in FIG. 1 will comprise three rule definitions as follows to express conditions necessary to control the greenhouse environments control:

```
(rule turn-on-greenhouse-heater
;
;       IF      any active greenhouse has a
;               temperature that is colder than the
;               acceptable range for any of the plants in
;               that greenhouse, and the heater in that
;               greenhouse is off
;
;       THEN    turn the heater on!
;
{       (greenhouse
                ^active true
                ^temp <current-temp> )       <greenhouse-Wm>
        (plant
                ^plant-loc <greenhouse-Wm>
                ^min-temp > <current-temp>)
{       (heater
                ^heat-loc <greenhouse-Wm>
                ^heat-state off)              <heater-Wm>}
→
        (turn-on-heater <greenhouse-Wm>.ID-number)
        (modify <heater-Wm> ^heat-state on)
) .
(rule turn-off-greenhouse-heater
;
;       IF      any active greenhouse has a
;               temperature that is warmer than the
;               acceptable range for any of the plants in
;               that greenhouse, and the heater in that
;               greenhouse is on
;
;       THEN    turn the heater off!
;
{               (greenhouse
                 ^active true
                 ^temp <current-temp> )       <greenhouse-Wm>
        (plant
                ^plant-loc <greenhouse-Wm>
                ^max-temp < <current-temp>)
{       (heater
                ^heat-loc <greenhouse-Wm>
                ^heat-state on)               <heater-Wm>}
→
        (turn-off-heater <greenhouse-Wm>.ID-number)
        (modify <heater-Wm> ^heat-state off)
)
```

```
(rule turn-on-greenhouse-humidifier
;
;    IF      any active greenhouse has a
;            plants in it that require humidity and
;            the humidity level in the green house is
;            lower than the acceptable range for any of
;            the plants in that greenhouse, and the
;            humidifier in that greenhouse is off
;
;    THEN    turn the humidifier with an
;            automatic shutoff on
;
;
{   (greenhouse
                ^active true
                ^humidity <current-hum>      <greenhouse-Wm>
    (plant
                ^plant-loc <greenhouse-Wm>
                ^requires-humidity true
                ^hum-level > <current-hum>)
{   (humidifier
                ^hum-loc <greenhouse-Wm>
                ^hum-state off)              <heater-Wm>}
→
    (set-humidity-level <greenhouse-Wm>.ID-number)
    (turn-on-humidifier <greenhouse-Wm>.ID-number)
    (modify <humidifier-Wm> ^hum-state on)
    )
```

A RETE-net generated by the compiler 22 pursuant to the device controlling rules is stored in the memory 38 of the inference engine 12, as shown in FIG 1. The configuration of the RETE-net, including its gamma memories is set forth in FIG. 4. The RETE-net implementing the three rules above comprises a start node 500, nine one-input test nodes 502-518, five join nodes 520-528 and three terminal nodes 530-534. Associated with each join node 520-528 is an alpha memory 570-578 and a beta memory 580-588. In addition, the RETE-net of the present invention as depicted in FIG. 2 comprises two two-input join nodes with gamma memories, 590, 592, and one one-input test node with a gamma memory 594. Each node with an associated gamma memory 518, 520, 522 also comprises a procedural attachment module 559, 561, 563 to perform the read procedure and update the attached WME slots.

Associated with all the start, one-input, and two input nodes are comparison modules 540-568 that implement the left-hand side rule conditions of the rule definitions described above. For example, the comparison module 550 of the one-input node 510 evaluates whether the WME tokens of class greenhouse have active slots that contain the value "true". Two rule definitions use the tokens passed as a result of that comparison. In addition, the RETE-net 32 of FIG. 1 combines multiple rule use of the same test into a single node (e.g. node 520) that are linked to subsequent tests.

Terminal nodes 530-534 are comprised of action instruction set modules 596-600 to carry out the right-hand side processing of the rules described above. For example, the terminal node 530 comprises an action instruction set module 596 to turn off the heater in a given greenhouse and set its heat-state value to "off".

RETE-net nodes are linked to each other either by subroutine calls that pass the token values as parameters or by a series of pointers. Nodes receive WME data as a series of tokens, evaluate the data referenced by the tokens, and either pass the results of computations as tokens to other nodes or discard the results. Nodes that contain gamma memories would also store results as described above as gamma memory location entries.

Figure 4:
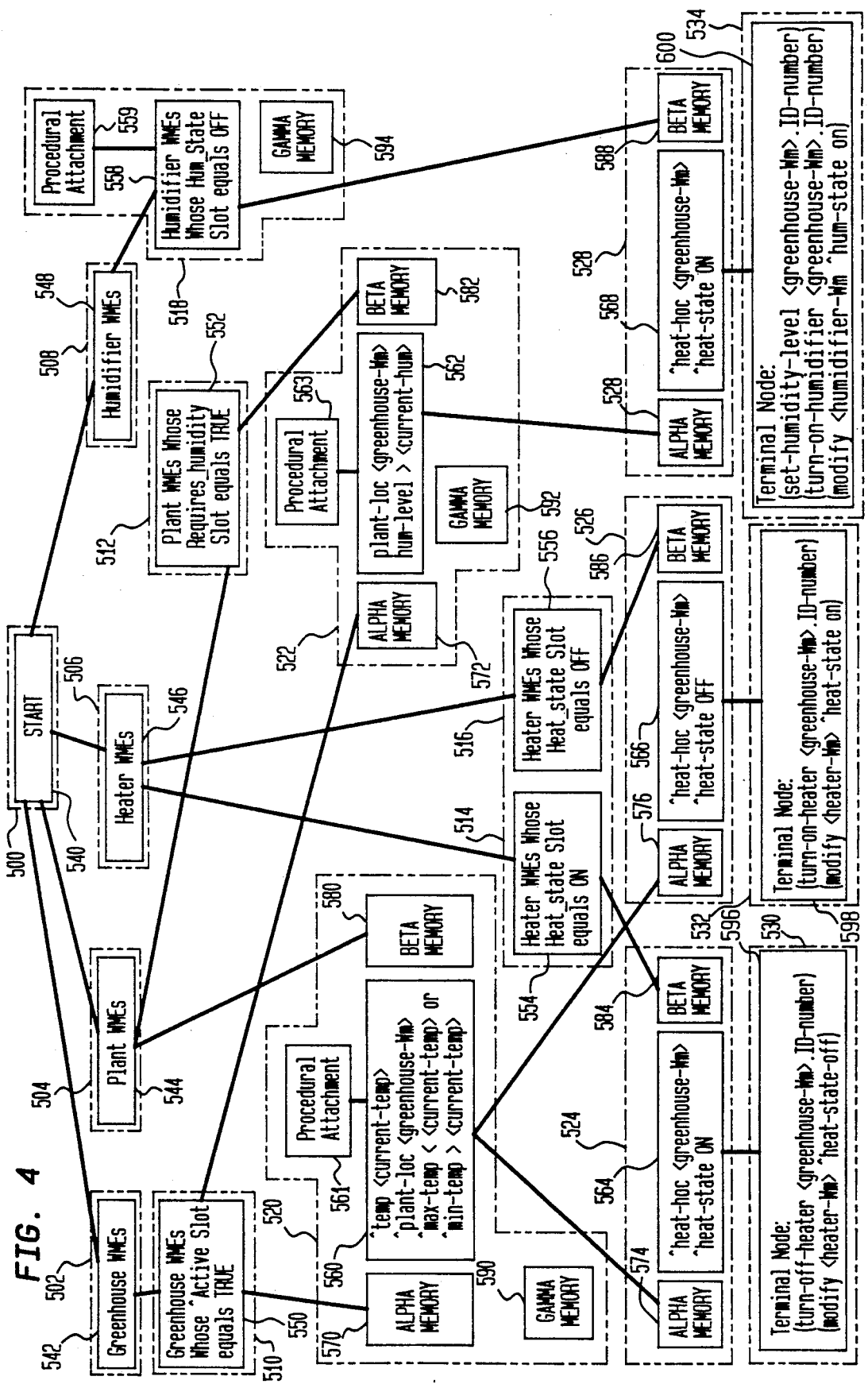
FIG. 4: depicts a RETE-net of an expert system to control temperature and humidity in greenhouses.

The RETE-net depicted in FIG. 4 is stored as the RETE-net 32 in the memory 38 in the inference engine 12 depicted in FIG. 1. Inputs to the RETE-net 32 come from the processor 36 and the working memory 34. As described above, a plurality of data elements 40 are stored in working memory 34. These data elements represent WMEs to be processed by the RETE-net 32.

The processor 36 manages the passing of tokens from node to node. As one embodiment, each node is a data structure that has one or more pointers to other nodes. The processor initially reads data slots of a WME 40 into working memory 34, and passes pointers to the grouped data as an add-token to the start node 500 of the RETE-net. The processor continues to pass add-tokens to each subsequent node in the RETE-net. The passing of pointers to a token can be completed in one of a number of ways such as sequentially, in parallel, recursively or even using the technique known as "depth first traversal of a directed acyclic graph". The mechanism by which tokens pointers are passed does not restrict the behavior or functioning of the RETE-net 32.

Several examples of the functioning of the RETE-net 32 are illustrated in FIGS. 5a-b, 6a-b, and 7a-b. For the purpose of illustration, suppose that the greenhouse company has 20 greenhouses, but only 4 are active, i.e., occupied by growing plants. The greenhouses are numbered one to twenty. In the four active greenhouses are the following plants and their relevant characteristics:

| Greenhouse | Plant | Temp Range | Needs Humidity | Humidity Level |
|---|---|---|---|---|
| 1 | Roses | 50-70 | yes | low |
| 2 | Mushrooms | 5-10 | yes | high |
| 3 | Cactus | 90-100 | no | none |
| 4 | Lilies | 70-80 | yes | medium |

Figure 5A:
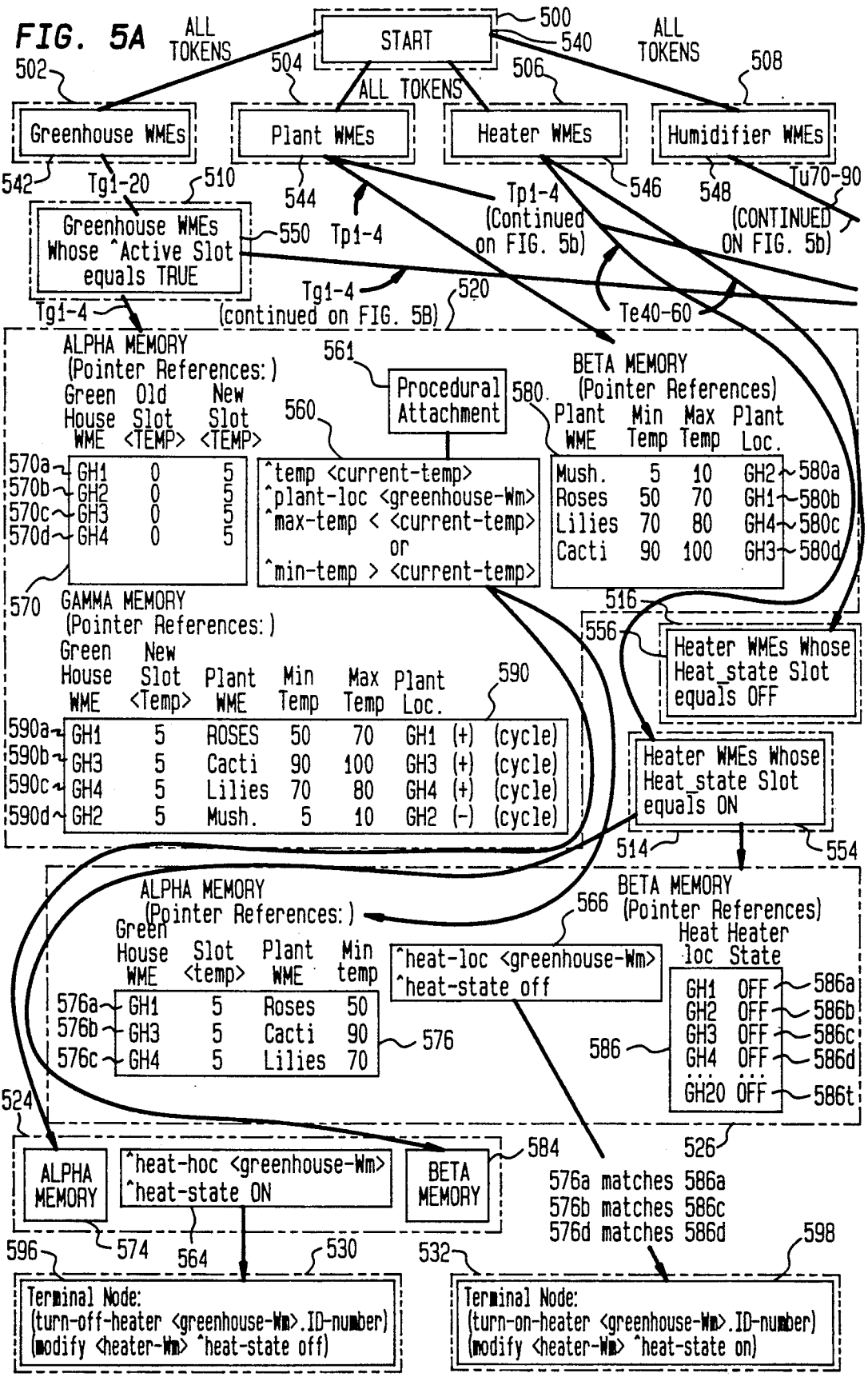
FIG. 5a–5b: depicts a RETE-net of an expert system with initial data input.
Figure 5B:
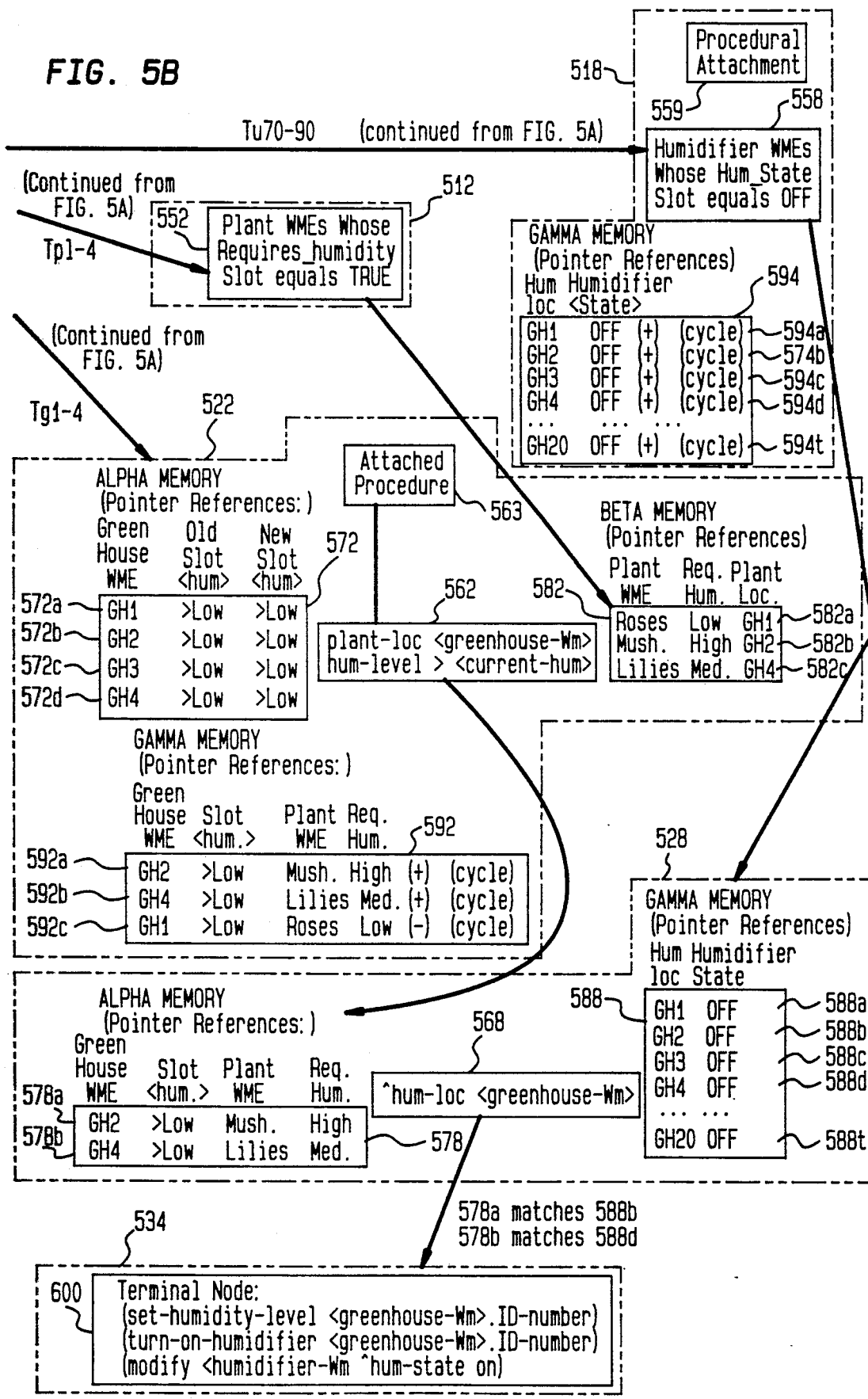

FIGS. 5a-b depict the process flow, as the data referencing tokens are initially processed. The start node 500 receives as input add-tokens referencing data from the four WME classes: greenhouse, plant, heater and humidifier. In this example, there will be twenty add-tokens of class greenhouse Tg1-20, each corresponding to one of the physical greenhouses used by the company, four plant tokens Tp1-4, each containing references to the plant data for the plants above, twenty heater tokens Te40-60, each containing data references to each greenhouse heater and twenty humidifier tokens Tu 70-90, each token containing data references to each greenhouse humidifier. The start node will send each of those tokens to the four initial test nodes in FIG. 5a (502, 504, 506, 508) for processing.

The one-input node 502 performs an identity test on the token input to select as output only WME's that are of the class greenhouse (i.e. Tg 1-20). The comparison module 542 will evaluate data referenced by each token and create only the tokens Tg1-20 to pass to the next one-input node 510. The node 504 selects only tokens referencing WMES of the class plant for further processing. In evaluating all token input, the comparison module 544 of the node 504 will pass as output only the tokens Tp1-4 which contains references to the plant WMEs (roses, mushrooms, cacti lilies). Node 504 passes the tokens to nodes 520 of FIG. 5a and 512 of FIG. 5b. The comparison module 546 of node 506 selects only tokens that reference WME's of the class heater for further processing. The node will only pass tokens Te40-60 that reference the 20 heater WMEs. However, the node 506 will pass those tokens to two different subsequent comparison nodes 514 and 516. The comparison module 548 of the node 508 selects only WMEs of class humidifier for further processing. The comparison module will select the input referenced by tokens Tu70-90 and pass them to the one-input node 518 in FIG. 5b.

Referring to FIG. 5a, the one-input module 510 on receiving tokens Tg1-20 begins to evaluate whether the "active" slot in each received greenhouse WME is true. The comparison module 550 will send as output add-tokens Tg1-4, corresponding to those greenhouses that are currently full of plants i.e. greenhouses 1-4. Add-tokens containing pointers to those selected WMEs are passed to two join nodes: 520 in FIG. 5a and 522 in FIG. 5b. The pointer references are stored in locations of the alpha memories of each join node: 570 in FIG. 5a and 572 in FIG. 5b.

Each alpha memory reference 570a-d in node 520 contains a pointer to a referenced greenhouse WME and a pointer to current temperature value. Assume here that it is very cold and the temperature is five degrees. Each alpha memory reference 572Ta-d in node 522 contains the token pointer to the current humidity value in the greenhouse.

The tokens Tp1-4 are passed to the join node 520 in FIG. 5a and one-input test node 512, in FIG. 5b. The comparison module 560 of node 520 places the references contained in those plant information tokens in beta memory locations 580a-d associated with that node.

In FIG. 5a, the join node 520 performs a number of tests to determine whether the plants in each greenhouse are within their own specific optimal temperature range. The comparison module 560 of this join node 520 accesses a live WME slot, i.e. the temp slot in the WMEs of class greenhouse. Thus, join node 520 has associated with it a gamma memory 590.

The comparison module 560 first performs the matching criteria of the node that does not involve the live slot comparison, before performing the temperature comparisons. In this node the greenhouse WME identification number referenced in alpha memory entries 570a-d must match a plant-loc slot referenced by the beta memory entries 580a-d. In the example, each plant-loc slot referenced in the beta memory locations 580 matches one greenhouse WME identifier: location 570a matches 580b; location of 570b matches 580a; token 570c matches 580d and token 570d matches 580c.

For those initial matches the comparison module 560 will involve the read procedural attachment and update the temp slot for each WME referenced by the alpha memory location. The comparison test involving the live slot searches for current temperature values that are either lower than the optimal minimum temperature of the plants in the greenhouse or greater than the maximum optimal temperature. For the initial matches the second comparison is made to compare the temperature in the greenhouse with the optimal temperature range of the plants contained. The comparison module invokes the procedural attachment.

However, for those matches to satisfy the comparison test, the comparison test of node 520, the current temperature must be outside of the optimal range for each plant. In this example, only three of the four possible matching combinations have greenhouse temperatures where action needs to be taken. The roses in greenhouse 1, the lilies in greenhouse 4 and the cacti in greenhouse 3 all grow more optimally in environments where the temperature is greater than 5 degrees. For each of those matches, the comparison module 560 will build an add-token that contains reference pointers to a conglomeration of WME slots representing each match. Three add tokens are passed to subsequent test nodes 524 and 526 in FIG. 5a. In this instance, the current temperatures in each of the greenhouses is too low for the plants that they contain. The three tokens created from the matches will be forwarded to nodes 524 and 526 which test whether the heaters in those greenhouses should be turned on or off.

In addition, the comparison module 560 will also write references to the four initial matches to the gamma memory 590. As three of the four initial matches were ultimately successful, the tokens in three locations created in the gamma memory 590 will be "+" locations 590a, 590b and 590c.

The initial match of mushrooms to greenhouse 2 was not ultimately successful in temperature comparison because the current temperature there is within the optimal temperature range for mushrooms. This match failed the comparison test only because of the procedurally attached value. Thus, the comparison module will create a "−" entry and store data in gamma memory location 590. For all gamma memory entries references, the comparison module stores a pointer to a WME slot containing a current cycle value which was the last time the temp slot in each of the four WMEs of type greenhouse was updated. The alpha memory location 576 of node 526 contains references to WME data on successful matches from the join node 520. The input at alpha memory location 576a, 576b, and 576c represent instances of greenhouses where the temperature is too cool for the plants in it. If the heaters in each of those greenhouses are off, the expert system 10 will turn the heaters on. Join node 526 determines whether a set of off heaters match a set of too cool greenhouses. The beta memory 586 in node 526 comprises locations 586a-d containing pointers received from tokens to heater WMEs whose heat-state slot is off. The input of beta memory locations 586a-d were sent as tokens by a one-input node 516, which compared all WMEs of type heater and checked them to determine whether the heater state slot in each received heater WME was off. Because all heaters in all greenhouses were off, the beta memory entries passed from the comparison module 556 includes references to all WMEs of class heater, passed as tokens Te40-60.

Node 526 compares its alpha and beta memories and matches alpha location entries 576a-c with the beta location entries 586a, 586c and 586d respectively. The comparison module 566 builds three add-tokens representing the union of alpha and beta sides for each match and passes each token to the terminal node 532. The tokens passed to terminal node 532 represent instances of WME data that have completely satisfied all left-hand tests of the rule to turn on the greenhouse heater. Representationally, this means that there are three greenhouses containing plants at temperatures too cold for optimal growth and whose heaters need to be turned on. The right-hand side of a rule will fire to turn on the heaters for these three greenhouses. The greenhouses containing the cacti, roses and lilies will begin to warm.

The example depicted in FIG. 5a-b will also cause the humidifier to activate for certain plants. Continuing the example in FIG. 5b, the alpha memory 572 of join node 522 comprises entries containing pointers to WMEs of class greenhouse whose active value is true. Alpha memory locations 572a-d contain pointer references to the WME and its current humidity value. (The old value is listed for reference for purposes of this example.) The comparison module 562 will compare the references in alpha memory locations 572a-d with beta memory locations 582a-c. The beta memory locations reference data on plants that require humidity. The data in those beta locations were passed as tokens to join nodes 522 by the one-input node 512 whose comparison module 552 selects only plant class tokens whose "requires-humidity" slot is true.

Comparison module 562 of node 522 attempts to determine from a set of active greenhouses, those greenhouses where the humidity for the plant in it is too low. The comparison module accesses the procedurally attached slot "humidity" from WMEs of class greenhouse; thus the join node 522 has associated with it gamma memory 592. The comparison module 562 matches plant to greenhouse by the "plant-loc" slot. There are three initial matches. Each plant matches a greenhouse location: beta location reference token 582a (roses) matches alpha greenhouse location reference 572a; the beta location reference 582b (mushrooms), the beta token 582b (mushrooms) matches alpha greenhouse location 572b and the beta location reference 582c lilies matches the greenhouse location 572d. The comparison module 562 next fires the attached read procedure for the three initial matches 563 to obtain the current humidity value for the three initial matches. Only two of the three matches have current humidity values lower than the desired humidity level. Mushrooms and lilies require additional humidity. For each of those matches, the comparison module 562 creates an add-token comprised of references to the matching greenhouse plant, and humidity level information. Those tokens are passed to the alpha memory 578 of the next comparison node 528. In addition two "+" entries are made in the gamma memory 592 of the node 522 at locations 592a, 595b. These entries represent instances that completely satisfy that node's comparison test.

In comparison, the beta memory location 582a, referencing plant WME data for the roses, initially matched the alpha greenhouse 572a entry, but the humidity level there did not require change, so the match failed node 522's comparison test. Because the match failed solely due to the attached value, the comparison module 562 will make a "−" entry at location 592c in gamma memory 592.

One-input node 518 also references a live slot value and has the gamma memory 594 associated with it. Comparison module 558 receives input tokens referencing on all WMEs of type humidity (Tu 70-90) and, using those references, the comparison module 58 determines which of those WMEs have a "humstate" value that is "off". Initially, all the humidifiers are off in the system. For each token, the comparison module 558 will fire the attached procedure and obtain the current state of the humidifier in each greenhouse (i.e. off). The references in every token passed to the comparison module 558 will satisfy the one-input node test. The comparison node 558 passes each token to the beta memory 588 of node 528. Because the comparison is performed on a live slot, the comparison module 558 also creates "+" entries at locations 594a-d in the gamma memory 594.

Node 528 determines whether in the greenhouses whose plants need humidity the humidifiers are off. The comparison module 568 matches the alpha memory list of active greenhouses whose plants need humidity against the beta memory list of greenhouse locations whose humidifiers are off. The beta memory locations 588b and 588d representing the humidifiers in greenhouses one and two match the alpha memory entries in locations 578a, 578b.

Those two matches represent a successful completion of the left-hand side rule to turn on humidifiers. The comparison module 568 creates add-tokens representing the matches and passes them on to the terminal node 534. The action instruction set module 600 receives the token input and fires the procedures to set the humidity level in the room and turn on the humidifier in the greenhouse containing mushrooms and the greenhouse containing lilies.

FIGS. 6a-6b depict changes to the state of the RETE-net occurring after the terminal nodes 532 and 534 fire. As stated above, the action set module 598 in terminal node 532 of FIG. 6a will fire the right-hand side rule instruction set to turn on heaters and warm the roses growing in greenhouse 1, the cacti growing in greenhouse 3 and the lilies growing in greenhouse 4. The action set module 598 will set the heat-state slot to "on" for each of the three heater WMEs corresponding to the tokens received by the terminal node 532 of FIG. 6a. The updates cause alterations to the RETE-net state.

For the three heaters in greenhouses 1,3 and 4 the heater state is now on. The processor 36 begins the modification process by passing to the start node 500 tokens to modify the RETE-net so it can properly represent the updates to the specific heater WMEs. For each heater WME, two tokens are passed: a delete token to expunge references to the heater being off in greenhouse 1, 3, 4, and an add-token showing that the heat state is now on. The one-input node 506 accepts the tokens as WME data of class "heater" and passes the tokens to the two subsequent one-input nodes 514 and 516.

Nodes 514 and 516 evaluate whether or not the heat state slot in each heater class WME is off or on. Each of these nodes has no alpha, beta or gamma memory associated with it so the delete token is simply passed on to subsequent nodes. The add-token, however, is evaluated. Comparison module 554 of node 514 looks for heater WMEs with a ^heat-state slot equal to on. Each of the three tokens passed have a ^heat-state slot equal to on. The comparison module 554 will create a token containing references to each of the three heaters' greenhouse location and the ^heat-state. Those created tokens are passed to node 524, where the references are stored in locations of its beta memory 584. Join node 524 evaluates whether or not the there are greenhouse heaters on which are warming the plants in those houses beyond their optimal growing temperatures. The three entries in the beta memory are depicted at locations 584a, 584b and 584c. Because the alpha memory 574 of node 524 contains no entries yet in this example, the comparison module 564 performs no comparison and the references from the tokens simply collect in the beta memory 584.

The node 516 also receives token updates from node 506 as input. As node 516 has no associated memories, the delete-tokens are simply forwarded to subsequent node 526. The comparison module 556 evaluates the add-token to determine whether the heat-state slot in heater WMEs referenced by those tokens is off. None of the values referenced by those add-tokens pass the test and processing stops.

The comparison module 566 of node 526 receives as input the delete tokens and expunges from its beta memory 586 the entries 586a, 586c and 586d that correspond to the WMEs whose ^heat-state slot is now set to off.

Continuing the example in FIG. 6b, when the terminal node 534 fired to set the humidifiers in greenhouses 2 and 4, the action set instruction module 600 set to "on" the ^hum-state slot for each of the corresponding humidifier WMEs. Those updates will cause another change in the state of the RETE-net.

The processor 36 creates delete-and then add-tokens referencing the updated ^hum-state slots for the two humidifier WMEs. The node 508 receives the token information and successfully evaluates the token data because they refer to WMEs of class humidifier. The comparison module 548 passes the tokens to node 518.

The comparison module 558 of node 518 evaluates whether the ^hum-state of each humidifier is off. The comparison module 558 accesses the live slot hum-state. The token inputs will create changes to the gamma memory 594 associated with node 518.

When the delete tokens are received, the comparison module 558 will eliminate all references to the affected humidifier WMEs, previously stored in gamma memory locations 594b and 594d. The delete-tokens are also forwarded to subsequent node 528.

For each of the add-tokens received in node 518, the comparison module 558 will fire the procedural attachment 559 and obtain the current hum-state value. Because the comparison tests for the new add-tokens fail due to the update of a procedurally attached variable, the comparison module creates entries in its gamma memory 594. The comparison module creates "−" entries for each of failed test in the gamma memory locations 594b, 594d. Because both add-tokens failed the test no add-tokens are propagated.

The comparison module 568 of node 528 receives as input only two delete tokens passed from node 518. Previously, the beta memory 588 of that node received tokens corresponding to all humidifiers that were off. Because the humidifiers in greenhouses 2 and 4 are now on, the comparison module must remove the "off" entries corresponding to humidifiers 2 and 4 from the beta memory 588. The comparison module locates the two locations in beta memory 588 and eliminates the entries 588b and 588d.

With no more RETE-net modifications caused by the right-hand side rule firings, the RETE-net waits until the next processing cycle.

Figure 7A:
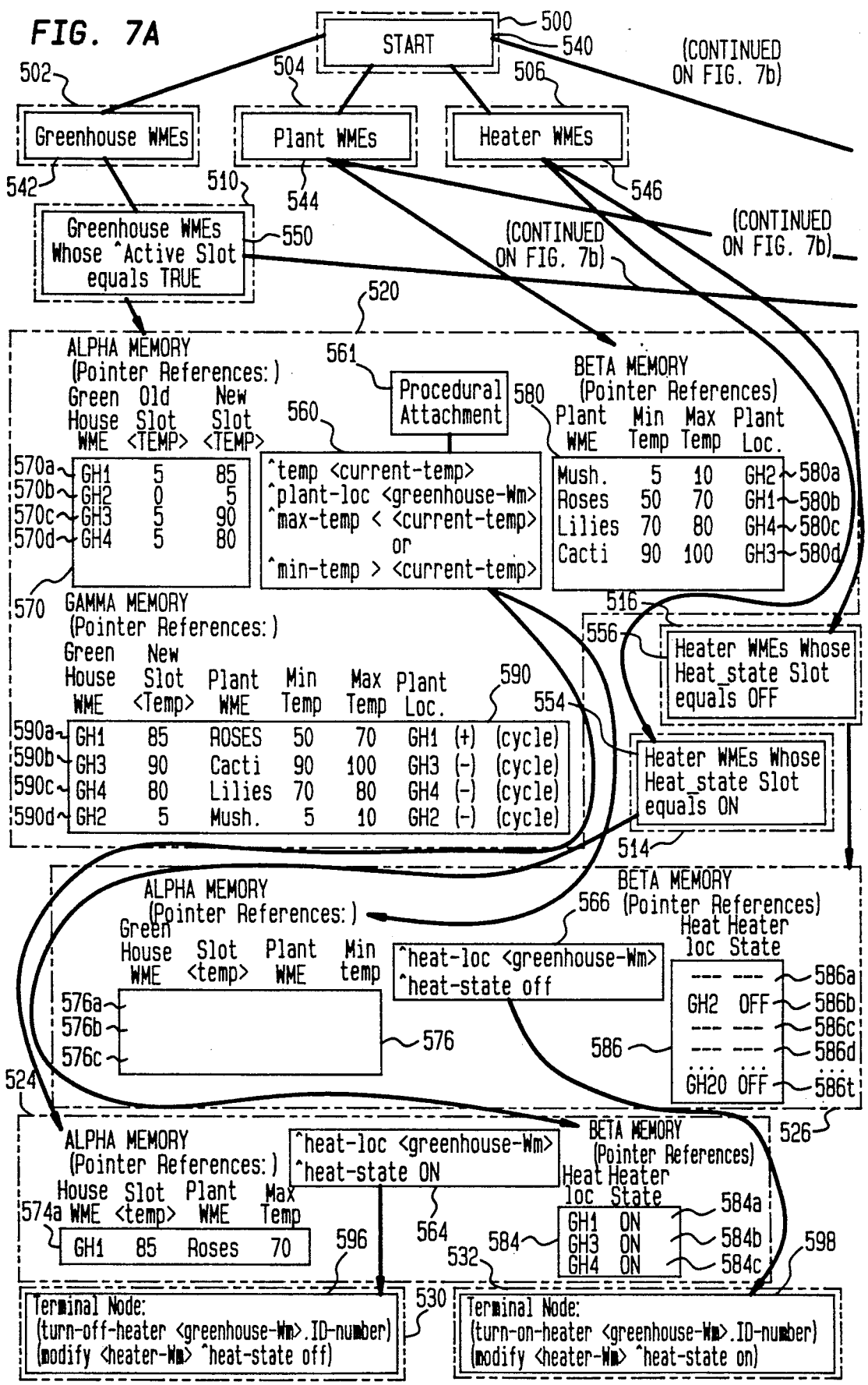

FIG. 7a–7b describes the process flow when the RETE-net is updated by the firing of read procedural attachments on entries stored in the gamma memories.

The processor 36 scans each of the gamma memories 590–594 in FIGS. 7a–7b at the end of any cycle to update the variables that have attached read procedures. If the gamma memory is empty then the processor will move to other gamma memories. However, in FIG. 7a, gamma memory 590 of node 520 has several gamma token entries 590a–d. For each gamma token 590a–d, the processor 36 will check the cycle time tag slot to see when the read procedural attachment was last fired. If the live slot has not been updated during the current cycle, the processor will fire the attached procedure 561 and mark the cycle time tag appropriately.

The temp slot of greenhouse WMEs has a procedural attachment that updates its value from a probe sensor. The processor 36 obtains current temperature values for all WMEs referenced by the entries in gamma memory 590. Entry 590a references the ^temp slot for the WME of greenhouse 1. Assume that the temperature in that greenhouse is now 85 degrees (since the heater has been on for sometime). The comparison module 560 will initiate a modification procedure to update the RETE-net after the procedural attachment execution, because the live slot value has changed. With the updated value, the comparison module 560 will determine anew whether the current temperature is either higher or lower than the optimal temperature range for the plants growing in that greenhouse. For the roses in that greenhouse the current temperature is too high—outside of the optimal range.

In this case the comparison module 560 will repropagate the RETE-net by creating tokens to delete the alpha memory entry 576a in node 526 and add an entry to the alpha memory 574 of node 524. In addition, the comparison module 560 updates gamma memory entry 590a, the process of which is described above.

Comparison module 560 reevaluates each of the entries in gamma memory in the manner described above Assume that after calling the procedural attachment for the gamma "+" entries 590b and c, the current temperatures for the corresponding greenhouses 3 and 4 is, respectively, 90 and 80 degrees. Both changes create updates to the alpha memory entries 570c and 570d. The comparison module 560 will re-test the alpha entries 570c and 570d, using an updated <current-temp> value to determine that the cacti in greenhouse 3 and the lilies in greenhouse 4 are both growing at temperatures within the acceptable range. For those updated nodes the test fails.

Comparison module 560 begins repropagation by changing previously "+" gamma memory entries 590b and 590c to "−" gamma memory entries. As the comparison test at node 520 failed after having previously succeeded, the repropagation procedure of the comparison module 560 creates delete tokens to remove the entries 576b and 576c from the alpha memory 576 of node 526.

Finally, the comparison node 560 fires the procedural attachment 561 to obtain an updated ^temp value for greenhouse[4] represented by the "−" gamma memory entry 590d. Assume that the value returned is five degrees. Because there has been no change to the values referenced by that gamma entry, no repropagation needs to occur.

Nodes subsequent to the gamma memory of node 520, will further process its propagated tokens. In the present example, node 524 receives an input to its alpha memory 574a that will requires a comparison test against each entry in its beta memory 584. The comparison module 564 determines whether the overheating greenhouse has a heater that has been turned on. The comparison module 564 will match the data referenced by alpha memory locations 574a with data referenced beta memory location 584a. An add-token is created to represent the union. The comparison module passes that token to the terminal node 530, whose action will be to fire the right-hand side procedures (i.e. turn the heater in greenhouse 1 off).

Node 522 in FIG. 7b also contains a gamma memory 592. The comparison module 562 of that node 522 seeks to match active greenhouses with plants that require additional humidity for optimal growth. For each gamma memory location 592a, 592b, 592c, the comparison module 592 first checks the cycle slot. If the cycle slot is equal to the current cycle, the comparison module 562 will fire the read procedural attachment 563. In node 522 the read procedural, 563 attached to the greenhouse WME humidity slot, reads the current humidity level for each greenhouse referenced by the gamma memory locations. Assume that for greenhouses 1 and 4 the attached procedure returns high humidity values. The comparison module updates the WME referenced by alpha memory locations 572a and 572d with the new values and performs its comparison test to determine whether the current humidity level is over the optimal threshold for the plants contained therein. For the roses (582a) contained in greenhouse 1 (572a) the humidity level continues to be over the optimum level. For this instance, the comparison module updates the "−" corresponding gamma memory location 592c to reflect the current humidity state and makes no further repropagation.

The update to the WME slot referenced by gamma token memory location 592b (lilies) will cause the previously successful comparison test to fail. Previously, the lilies growing in greenhouse 4 required additional humidity. However, the current humidity value in greenhouse 4 is now over the threshold range. The comparison test for additional humidity fails. The comparison module 562 updates the gamma memory location 592b from "+" to "−" to show that the match would have been successful but for the current live slot humidity value. The comparison module repropagates the subsequent nodes of the RETE-net by creating a token to delete the previous entry 578b from the alpha memory 578 of the node 528.

The comparison module 562 finally evaluates the humidity slot referenced by gamma location 592a. The value returned is a medium value, one changed from the past value obtained for the mushrooms growing in greenhouse 2. The comparison module 562 updates the humidity value of the alpha memory token 572d. In comparison, the humidity value for greenhouse 4 is still less than the humidity level needs to optimally grow mushrooms. The mushrooms still need more humidity. Comparison module 562 updates "+" token 592a in gamma memory 592 referencing the current humidity value and the current cycle time tag. Finally, the comparison module creates delete and add-tokens to update the alpha memory token 528c with the current humidity level. The humidifier in the greenhouse by initial assumption will continue until it reaches a high humidity level and then turn itself off.

Gamma memory update processing will also be performed in the one-input gamma memory node 518. Previously, humidifiers in all the greenhouses were in the off state, except for the humidifiers working in greenhouses 4 and 2. The comparison module 558 will update the states for all of the humidifiers. By firing the attached procedure 559, the comparison module 558 returns the same values for all of the humidifiers except one. The humidifier in greenhouse 4 that was previously humidifying the lilies had completed its function and has now automatically shut off. The comparison module 558 will modify the corresponding gamma memory location 594d, changing it from a "−" to a "+" entry. The comparison module will propagate delete and add-tokens to subsequent nodes to the gamma memory node 518. The data from that token be stored in beta memory location 588d of subsequent node 568.

The RETE-net will continue processing in the fashion described. The above described embodiment of the invention is meant to be representative only, as certain changes may be made therein without departing from the clear teachings of the invention. Accordingly, references should be made to the following claims which alone define the invention.

What is claimed is:

1. A computer-based discrimination network for evaluating a set of rules, each rule comprising a set of conditions, each condition including at least one data value variable slot used to accept values of data elements input from a working memory to the network for use in the evaluation of the condition to yield a result, the evaluation of the set of conditions occurring in a condition-matching cycle, the network comprising:

(a) a plurality of nodes, each of the nodes representing one of the set of conditions, the plurality of nodes being coupled to one another in a manner to represent the set of rules;

(b) a processor coupled to the plurality of nodes for passing values of data elements from the working memory to the network and evaluating the conditions represented by each node;

(c) at least one live slot being a pre-determined data value variable slot within a pre-determined data value variable slot within a pre-determined condition, the at least one live slot linked to a corresponding procedure and causing the corresponding procedure to execute, the execution causing a new value of a data element to be supplied to the at least one live slot; and (d) a gamma memory associated with each one of the rules having a condition with a live slot, each gamma memory storing references to the values of the data elements accepted by the set of conditions of each associated one of the rules having a condition with a live slot where a predetermined result is yielded by a pre-determined subset of the conditions.

2. The computer-based discrimination network of claim 1 further comprising:

(a) a first memory containing the values of data elements; and (b) the processor coupled to the plurality of nodes being coupled to the first memory and arranged to pass the values of said data elements by passing pointers that reference said data elements, said pointers comprising references to memory locations that contain the values of data elements.

3. The computer-based discrimination network of claim 1 further comprising:
   (a) a first memory containing values of data elements; and
   (b) the processor coupled to the plurality of nodes being coupled to the first memory and arranged to pass actual data elements as tokens, said tokens comprising data elements stored in the first memory.

4. The computer-based discrimination network of claim 1 further comprising at least one subroutine, said subroutine comprising computer program language statements, the statements together representing the conditions of one of the set of rules.

5. The computer-based discrimination network of claim 1 wherein the pre-determined subset of conditions are the conditions of one of the rules, which conditions do not have a live slot.

6. The computer-based discrimination network of claim 5 wherein each condition yields a true/false result.

7. The computer-based discrimination network of claim 6 wherein the pre-determined result is a true result yielded by all the conditions in the pre-determined subset of conditions.

8. The computer-based discrimination network of claim 6 wherein each rule further comprises a firing part, the firing part being a task processed by the processor when each of the set of conditions comprising the rule is evaluated as true.

9. The computer-based discrimination network of claim 8, wherein the processor performs a predetermined conflict resolution scheme such that when more than one set of conditions comprising a rule are evaluated as true, the conflict resolution scheme determines which firing part to execute.

10. The computer-based discrimination network of claim 1 further comprising an alpha memory and a beta memory, the alpha memory associated with a first condition of one of the rules having two conditions, the alpha memory storing references to the data elements accepted by the first condition, the beta memory associated with a second condition of the rule having two conditions, the beta memory storing references to the data elements accepted by the second condition.

11. The computer-based discrimination network of claim 1 wherein the processor modifies the gamma memory of a rule after the new value of the data element is supplied to the at least one live slot of the condition of the rule.

12. The computer-based discrimination network of claim 11 wherein the modification to the gamma memory by the processor includes adding an add sign to the reference of each value of the data elements where the data elements satisfy all the conditions of the rule.

13. The computer-based discrimination network of claim 11 wherein the modification to the gamma memory by the processor includes adding a minus sign to the reference of each value of the data elements where the data elements do not satisfy all the conditions of the rule.

14. The computer-based discrimination network of claim 1 further comprising an update slot associated with each live slot to store a cycle number.

15. The computer-based discrimination network of claim 1 wherein the set of rules are re-evaluated by the processor after all the conditions in the set of conditions are evaluated in the condition-matching cycle.

16. A method carried out by a computer processor for evaluating a rule comprising a set of conditions in a network, the conditions comprising variables and operators, the variables corresponding to data values stored in a first memory, a variable in one of the conditions of the rule having associated with it a read procedural attachment, the read procedural attachment comprising a read function to provide a new data value for the variable that has the associated read procedural attachment, the network comprising a plurality of interconnected nodes, each node representing a condition, the plurality of nodes being coupled in such a manner to represent the set of conditions of the rule, the method carried out by the processor comprising the steps of:
   (a) presenting a token representative of the data values of the variables of one of the set of conditions to the network;
   (b) evaluating the conditions of the rule that comprise variables that do not have the associated read procedural attachment to determine whether the conditions are satisfied by the token;
   (c) if the conditions of the rule that comprise variables that do not have the associated read procedural attachment are satisfied by the token, storing the token in a second memory;
   (d) if the conditions of the rule that comprise variables that do not have the associated read procedural attachment are satisfied by the token,
      (i) evaluating the node having the read procedural attachment on the variable of the condition by performing the read procedural attachment to collect the new data value,
      (ii) evaluating the conditions of the rule that comprise the variable that has the associated read procedural attachment using the new data value to determine whether the conditions of the rule are satisfied, and
      (iii) modifying the second memory to store the results of the evaluation of the rule.

17. The method of claim 16 wherein the network is arranged to evaluate a plurality of expressions.

18. The method of claim 17 comprising the following further steps of:
   (g) performing subsequent acts when the conditions of any one of the plurality of the rules are satisfied;
   (h) for all instances where two tokens satisfy all conditions of two rules, performing a conflict resolution analysis comprising a pre-selected conflict resolution scheme to determine which subsequent acts between the two rules to perform first; and
   (i) evaluating for each of the two rules where the result of one of such rules is based on a value having been determined by the read procedural attachment, performing the read procedural attachment again to collect the data value updated by the read procedural attachment, and re-evaluate the one rule using the updated value to re-determine whether the conditions of the one rule is satisfied.

19. The method of claim 16 wherein step (a) further comprises the steps of:

(a) storing the values of the variables of one of the set of conditions in a third memory;

(a) presenting the token representative of the values of the variables of one of the set of conditions to the network as a pointer to the location of the value of the variables of the condition in the third memory; and (a) accessing the values of the variables of the condition using the pointer.

20. The method of claim 16 wherein step (a) further comprises the steps of placing the value of the data element into the token and presenting the token to the network.

21. The method of claim 16 wherein each of the nodes comprises at least one subroutine, said subroutine comprising computer program language statements, said statements being coupled in such a manner to represent the conditions of the rule.

22. The method of claim 10 wherein more than one variable in one of the conditions of the rule has associated with it a read procedural attachment.

23. The method of claim 16 wherein parts (i) to (iii) of step (d) are also performed if all conditions of the rule comprise variables that have the associated read procedural attachment.

24. A computer-implemented method for updating data when evaluating an expression comprising a set of conditions organized into a network, the conditions each comprising at least one variable slot, in which data is input to evaluate the conditions, the network comprises a plurality of test nodes each representative of one of the set of conditions, each test node being connected to other test nodes in the network, each one of the test nodes having at least one input means for evaluating the condition and an output, all coupled to a memory, the computer-implemented method comprising the steps of:

(a) declaring a variable slot of the condition of a pre-selected one of the test nodes to be attached to a read function that provides an updated data value for the variable;

(b) presenting a token containing data to the input of the pre-selected test node;

(c) invoking the attached read function before evaluating the token against the condition;

(d) determining whether the token satisfies the condition of the pre-selected test node using the updated data value in the variable slot of the condition;

(e) dividing the memory into areas to cumulatively store the result of the determining step for the pre-selected test node, the result indicating if the condition is satisfied or if the condition is not satisfied only because the updated data value fails to satisfy the condition;

(f) passing to other connected test nodes in the network tokens containing data used in evaluating the expression, when the condition of the pre-selected test node has been satisfied;

(g) repeating steps (b)-(f) each time a new token is presented to the input of the pre-selected test node;

(h) re-evaluating the attached read function for each one of the cumulatively stored results to produce a set of re-updated data values; and (i) repeating steps (d)-(f) using the set of re-updated data values.

25. A computer program in a storage device for use in connection with a computer processor adapted to respond to changes when evaluating an expression comprising a set of conditions in which the evaluation of the expression is based upon values of data elements presented to the computer program, the computer program comprising:

(a) a plurality of interconnected node modules operative in the computer processor, each of the node modules representing one of the conditions of the expression, each one of the plurality of node modules including at least one input to receive data in evaluating the condition, and an output being coupled in such a manner to represent the set of conditions in the expression;

(b) a token passing module operative in the computer processor for passing tokens representative of data elements to the inputs of the node modules;

(c) a read module operative in the computer processor connected to one of the node modules for accessing a data input from a peripheral source and returning a current data element to be used in evaluating the condition of the one node module;

(d) a testing module operative in the computer processor for determining whether one of the tokens input to the one node module satisfies the condition of the one node module that will upon evaluating the condition of the one node invoke the read module before determining whether the input to the one node module satisfies the corresponding condition of the one node module;

(e) a storage module operative in the computer processor for storing in a memory coupled to the computer processor tokens comprising data used in evaluating the condition of the one test node with an indication that the data contained in the token satisfies the condition or the data contained in the token fails the condition only because the current data element, obtained from the read module, does not satisfy the condition; and (f) a token propagation module operative in the computer processor for propagating a token from the output of the one node, if the condition of the one node is satisfied.

26. The computer program of claim 25 wherein the token passing, read, storage, testing and token propagation modules, each further comprises:

(a) sub-modules operative in the computer processor to accept data elements in the form of pointers comprising location references to peripheral sources;

(b) sub-modules operative in the computer processor to access data elements located in said peripheral sources;

(c) sub-modules operative in the computer processor to store updated information in said peripheral location accessible by the pointers; and (d) sub-modules operative in the computer processor to propagate the pointers containing the results of the evaluation to subsequent modules.

27. The computer program of claim 25 further comprising a re-evaluation module operative in the computer processor that re-invokes the read module after a pre-determined time period or in a subsequent cycle and invokes the read module and the testing module.

28. The computer program of claim 25 wherein the computer program is arranged to evaluate a plurality of expressions and further comprises a subsequent action module operative in the computer processor to perform a pre-selected set of subsequent actions when each of the conditions of one or more of the expressions are satisfied.

29. A computer-based expert system comprising a plurality of expressions, each expression comprising a set of conditions, the conditions including at least one variable slot wherein the evaluation of each condition is based upon values of data elements input to the variable slots, the expert system comprising:
  (a) a first memory having a plurality of data elements stored therein;
  (b) a plurality of nodes each representing one of the conditions comprising the expression, the plurality of nodes being coupled to one another in a manner to represent the set of the conditions comprising the expression;
  (c) a processor coupled to the first memory and the plurality of nodes to input values of the data elements stored in the first memory to the data value variable slots of the conditions represented by the plurality of nodes and evaluating the expression for each one of the values of data elements input to the data value variable slots of the conditions represented by the nodes;
  (d) at least one live slot being a pre-determined variable slot within a pre-determined condition, the at least one live slot linked to a corresponding procedure causing the corresponding procedure to execute, the execution causing a new value of a data element to be supplied to the at least one live slot; and
  (e) a second memory associated with each one of the plurality of expressions having a condition with a live slot, each second memory storing references to the values of the data elements input to the variable slots of the conditions of each associated one of the plurality of expressions having a condition with a live slot where a predetermined result is yielded by a pre-determined subset of the conditions;
  the processor operating to evaluate each one of the plurality of expressions using the new data value and to store the result of each one of the plurality of expressions and the values used in evaluating the expressions in the second memory.

30. The expert system of claim 29 wherein the system is arranged to pass pointers to memory locations that contain values of data elements, said processor being arranged to access said data values using the pointers.

31. The expert system of claim 29 further comprising;
  (a) a subsequent action device to perform a preselected set of subsequent actions when all the conditions of one or more expressions are satisfied;
  (b) a conflict resolution scheme, said conflict resolution scheme comprising means to determine which of the subsequent actions of each expression to take when all of the conditions of two or more of the expressions are satisfied; and
  (c) at least one of the plurality of nodes arranged to execute the corresponding procedure that has been placed upon the live slot, to collect a new data value for that data value variable slot updated by the execution of the corresponding procedure, and to evaluate the condition represented by that node, the conflict resolution scheme further comprising means for re-evaluating the expression using the new data value, means for storing the data used to evaluate the expression and the result of evaluating the expression using the new data value in the second memory, and, before taking the subsequent actions, and means for re-evaluating the expression using the stored values and a further data value obtained by re-executing the corresponding procedure.

32. The expert system according to claim 29 wherein at least one of the plurality of nodes is a node having one data input and one live slot and is arranged to execute the corresponding procedure.

33. The expert system according to claim 29 wherein at least one of the plurality nodes is a node having two data inputs and one live slot and is arranged to execute the corresponding procedure.

* * * * *